United States Patent
Ohsato

(10) Patent No.: US 8,607,646 B2
(45) Date of Patent: Dec. 17, 2013

(54) FORCE SENSOR CHIP AND ACCELERATION SENSOR CHIP

(75) Inventor: Takeshi Ohsato, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 307 days.

(21) Appl. No.: 13/075,814

(22) Filed: Mar. 30, 2011

(65) Prior Publication Data

US 2011/0239784 A1 Oct. 6, 2011

(30) Foreign Application Priority Data

Mar. 30, 2010 (JP) ................................. 2010-076892

(51) Int. Cl.
*G01L 1/22* (2006.01)

(52) U.S. Cl.
USPC ................................................... 73/862.044

(58) Field of Classification Search
USPC ...................... 73/862.041–862.046
See application file for complete search history.

(56) References Cited

U.S. PATENT DOCUMENTS

| | | | | |
|---|---|---|---|---|
| 3,662,312 A | * | 5/1972 | Thorp et al. | 338/4 |
| 4,320,664 A | * | 3/1982 | Rehn et al. | 73/708 |
| 4,428,976 A | * | 1/1984 | Eisele et al. | 427/96.2 |
| 4,703,663 A | * | 11/1987 | Oppermann | 73/862.68 |
| 6,422,088 B1 | * | 7/2002 | Oba et al. | 73/754 |
| 2005/0050959 A1 | * | 3/2005 | Ooba et al. | 73/775 |

FOREIGN PATENT DOCUMENTS

JP 2009-175088 8/2009

* cited by examiner

*Primary Examiner* — Max Noori
(74) *Attorney, Agent, or Firm* — Squire Sanders (US) LLP

(57) ABSTRACT

A force sensor chip of the present invention is for detecting an external force, and comprises a base member including an action portion where the external force is applied, a support portion that supports the action portion therearound, and a connecting portion that connects the action portion and the support portion together, a plurality of strain detecting resistive elements that are formed at respective deformation producing portions of the base member which deform when the external force is applied, and a thin-film resistor that is formed at upper layers of the strain detecting resistive elements with a resistive-element wiring and an interlayer insulation film intervening between the thin-film resistor and the strain detecting resistive elements.

16 Claims, 19 Drawing Sheets

FORCE SENSOR CHIP AND ACCELERATION SENSOR CHIP

CROSS REFERENCE TO RELATED APPLICATION

The application claims the foreign priority benefit under Title 35, United States Code, Section 119(a)-(d) of Japanese Patent Application No. 2010-076892, filed on Mar. 30, 2010, the contents of which are hereby incorporated by reference.

BACKGROUND OF THE INVENTION

1. Field of the Invention

The present invention relates to a chip for a force sensor that detects an external force through resistive elements and a chip for an acceleration sensor that detects an acceleration through resistive elements.

2. Description of the Related Art

In the field of automatic operating machines, such as machine tools and robots, a force is applied to a work target or an external force is received through a work operation. In this case, it is necessary for an automatic operating machine to detect external force and moment, and to perform a control in accordance with the detected force and moment. In order to perform such a control highly precisely in accordance with detected force and moment, it is necessary to precisely detect a force from the exterior (an external force) and a moment.

Hence, various kinds of force sensors are proposed so far. Conventionally known force sensors employ a fundamental configuration in which a plurality of strain detecting resistive elements are provided at deformation portions of an elastic body which elastically deforms in accordance with an external force. When an external force is applied to the elastic body of a force sensor, the plurality of strain detecting resistive elements output electrical signals in accordance with the level of deformation (a stress) of the elastic body. Based on such electrical signals, forces, etc., of equal to or greater than two components applied to the elastic body can be detected.

An example of such a force sensor is a hexaxial force sensor. Such a hexaxial force sensor divides an applied force into stress components (forces: Fx, Fy, and Fz) in individual axial directions of three axes (X axis, Y axis, and Z axis) of a Cartesian coordinate system and torque components (moments: Mx, My, and Mz) in individual axial directions, and detects those as hexaxial components.

Such a force sensor utilizes a characteristic such that the strain detecting resistive element deforms upon application of an external force and the resistance value of such element changes, detects a change in the output voltage based on a change in the resistance value of the strain detecting resistive element, thereby measuring the magnitude of an external force. The strain detecting resistive element used in the force sensor has a temperature dependency which changes the resistance value depending on a temperature. Accordingly, the resistance value varies (drifting) until the temperature of the strain detecting resistive element becomes steady after a driving voltage is applied, and the output voltage becomes also unstable originating from such a varying. Such a condition is referred to as a transient condition, and according to the conventional force sensors, it is difficult to precisely measure an external force in the transient condition.

In order to reduce a time (a transient condition) until becoming a steady state after a voltage is applied, a semiconductor pressure sensor disclosed in JP2009-175088A employs a configuration in which a semiconductor substrate is provided with a heater electrode, a strain detecting resistive element (a piezo resistor) is heated through the semiconductor substrate by the heater electrode in order to promote heat generation, thereby shortening the time of a transient condition.

The semiconductor pressure sensor of JP2009-175088A has, however, a restriction such that individual functional elements must be laid out within a limited space. Accordingly, although the heater electrode is formed at a circumferential edge of the semiconductor substrate which is apart from the strain detecting resistive element, there is a time lag until heat is transmitted to the strain detecting resistive element located in the vicinity of the center through the semiconductor substrate, and there is varying in temperature among respective resistive elements. In order to eliminate such time lag and temperature varying, when the voltage applied to the semiconductor substrate is increased, the production cost increases and the semiconductor substrate may be deformed due to heat.

SUMMARY OF THE INVENTION

The present invention has been made in view of the foregoing circumstance, and it is an object of the present invention to provide a force sensor chip and an acceleration sensor chip which operate at a low voltage, are capable of promoting a self-heat-generation of a strain detecting resistive element without a time lag and a temperature varying, and are also capable of dramatically reducing a time until the temperature of the strain detecting resistive element becomes steady after a voltage is applied.

In order to achieve the above object, a first aspect of the present invention provides a chip for a force sensor that detects an external force, including: a base member including: an action portion where the external force is applied; a support portion that supports the action portion therearound; and a connecting portion that connects the action portion and the support portion together; a plurality of strain detecting resistive elements that are formed at respective deformation producing portions of the base member which deform when the external force is applied; and a thin-film resistor that is formed at upper layers of the strain detecting resistive elements with a resistive-element wiring and an interlayer insulation film intervening between the thin-film resistor and the strain detecting resistive elements.

The force sensor chip employing such a configuration has the thin-film resistor arranged in the vicinity of (at the upper layer of) the strain detecting resistive elements, so that when a voltage is applied to the thin-film resistor, the resistive heat thereof is transferred to the strain detecting resistive elements without a time lag.

The aforementioned force sensor chip further includes: a high-potential electrode and a low-potential electrode that are formed on the support portion; and a thin-film-resistor wiring that connects the thin-film resistor to the high-potential electrode and to the low-potential electrode, in which the thin-film resistor is formed to have an area covering the plurality of strain detecting resistive elements in a planar view, has one end connected to the high-potential electrode through the thin-film-resistor wiring, and has another end connected to the low-potential electrode through the thin-film-resistor wiring.

The force sensor chip employing such a configuration has the thin-film resistor formed at the upper layer of the strain detecting resistive elements so as to have an area covering the plural strain detecting resistive elements. Accordingly, when a voltage is applied across the high-potential electrode and the low-potential electrode to the thin-film resistor, the plural strain detecting resistive elements are heated without a temperature varying by the resistive heat of the thin-film resistor.

The aforementioned force sensor chip further includes: a high-potential electrode and a low-potential electrode that are formed on the support portion; and a thin-film-resistor wiring which is formed at an upper layer of the thin-film resistor and which connects the thin-film resistor to the high-potential electrode and the low-potential electrode, in which the thin-film resistor is formed to have a same area as the area of each strain detecting resistive element, and a same number of thin-film resistors are formed as a number of the strain detecting resistive elements, the thin-film resistor having one end connected to the high-potential electrode through the thin-film-resistor wiring, and having another end connected to the low-potential electrode through the thin-film-resistor wiring.

The force sensor chip employing such a configuration has the thin-film resistor at the upper layer of the strain detecting resistive element formed so as to have the same area as that of the strain detecting resistive element and the same number of thin-film resistors are formed as that of the strain detecting resistive elements. Hence, the resistive heat by the thin-film resistor can be efficiently transferred only to the strain detecting resistive element. Accordingly, a voltage to be applied to the thin-film resistor can be reduced, and the effect by the resistive heat to the base member can be suppressed as much as possible.

The aforementioned force sensor chip further includes a passivation film formed at an upper layer of the thin-film resistor with the interlayer insulation film intervening therebetween.

According to the force sensor chip employing such a configuration, the passivation film formed on the outermost surface of the chip can suppress a breakage by an application of an external force.

The aforementioned force sensor chip further includes a passivation film formed at an upper layer of the thin-film resistor with the thin-film-resistor wiring and the interlayer insulation film intervening between the passivation film and the thin-film resistor.

According to the force sensor chip employing such a configuration, the passivation film formed on the outermost surface of the chip can suppress a breakage by an application of an external force.

In the aforementioned force sensor chip, the connecting portions are formed around a center of the action portion so as to be symmetrical at four positions to the center of the action portion, and the high-potential electrode and the low-potential electrode are formed at diagonal positions on the support portion.

The force sensor chip employing such a configuration has the connecting portions so as to be symmetrical to the center of the action portion at four positions. Accordingly, the action portion can be supported by the support portion in the four directions in a well-balanced manner. Also, the high-potential electrode and the low-potential electrode are formed at diagonal positions, so that the wiring designing of the thin-film resistor to each electrode becomes easy.

In the aforementioned force sensor chip, the action portion, the support portion and the connecting portion are functionally separated from one another by a first through-hole.

The force sensor chip employing such a configuration causes the action portion and the support portion to be separated by the through-hole, so that an external force applied to the action portion is not distributed to the support portion, etc., but is concentrated on the strain detecting resistive elements. Accordingly, the external force applied to the action portion can be detected more precisely.

In the aforementioned force sensor chip, each of the connecting portions includes a region with a high rigidity and a region with a low rigidity.

According to the force sensor chip employing such a configuration, when an external force is applied to the action portion, the region with a low rigidity absorbs excessive strain acting on the region with a high rigidity, thereby suppressing a strain of a whole force sensor chip originating from an application of a force or a moment in a direction. Therefore, a strain detecting resistive element corresponding to a force or a moment in a specific direction can be selectively caused to produce a strain, thereby remarkably suppressing interference in another axial direction.

In the aforementioned force sensor chip, the region with a high rigidity and the region with a low rigidity are functionally separated from each other by a second through-hole.

According to the force sensor chip employing such a configuration, the region with a high rigidity and the region with a low rigidity are separated by the through-hole. Hence, an external force applied to the action portion is not dispersed to the support portion, etc., but is concentrated on the strain detecting resistive elements. Accordingly, the external force applied to the action portion can be detected more precisely.

A second aspect of the present invention provides a chip for an acceleration sensor that detects an acceleration, comprising: a base member including: an action portion with a weight that makes a displacement when an acceleration acts thereon; a support portion that supports the action portion therearound; and a connecting portion that connects the action portion and the support portion together; a plurality of strain detecting resistive elements formed at respective deformation generating portions of the base member that deform when the acceleration is applied; and a thin-film resistor that is formed at upper layers of the strain detecting resistive elements with a resistive-element wiring and an interlayer insulation film intervening between the thin-film resistor and the strain detecting resistive element.

The acceleration sensor chip employing such a configuration has the thin-film resistor arranged in the vicinity of (at the upper layer of) the strain detecting resistive elements, so that when a voltage is applied to the thin-film resistor, the resistive heat thereof is transferred to the strain detecting resistive elements without a time lag.

The aforementioned acceleration sensor chip further includes: a high-potential electrode and a low-potential electrode that are formed on the support portion; and a thin-film-resistor wiring that connects the thin-film resistor to the high-potential electrode and to the low-potential electrode, in which the thin-film resistor is formed to have an area covering the plurality of strain detecting resistive elements in a planar view, has one end connected to the high-potential electrode through the thin-film-resistor wiring, and has another end connected to the low-potential electrode through the thin-film-resistor wiring.

The acceleration chip employing such a configuration has the thin-film resistor formed at the upper layer of the strain detecting resistive elements so as to have an area covering the plural strain detecting resistive elements. Accordingly, when a voltage is applied across the high-potential electrode and the low-potential electrode to the thin-film resistor, the plural strain detecting resistive elements are heated without a temperature varying by the resistive heat of the thin-film resistor.

The aforementioned acceleration sensor chip further includes: a high-potential electrode and a low-potential electrode that are formed on the support portion; and a thin-film-resistor wiring which is formed at an upper layer of the thin-film resistor and which connects the thin-film resistor to the high-potential electrode and the low-potential electrode, in which the thin-film resistor is formed to have a same area as the area of each strain detecting resistive element, and a same number of thin-film resistors are formed as a number of the strain detecting resistive elements, the thin-film resistor having one end connected to the high-potential electrode through the thin-film-resistor wiring, and having another end connected to the low-potential electrode through the thin-film-resistor wiring.

The acceleration sensor chip employing such a configuration has the thin-film resistor at the upper layer of the strain detecting resistive element formed so as to have the same area as that of the strain detecting resistive element and the same number of thin-film resistors are formed as that of the strain detecting resistive elements. Hence, the resistive heat by the thin-film resistor can be efficiently transferred only to the strain detecting resistive element. Accordingly, a voltage to be applied to the thin-film resistor can be reduced, and the effect by the resistive heat to the base member can be suppressed as much as possible.

The aforementioned acceleration sensor chip further includes a passivation film formed at an upper layer of the thin-film resistor with the interlayer insulation film intervening therebetween.

According to the acceleration sensor chip employing such a configuration, the passivation film formed on the outermost surface of the chip can suppress a breakage by an application of an external force.

The aforementioned acceleration sensor chip further includes a passivation film formed at an upper layer of the thin-film resistor with the thin-film-resistor wiring and the interlayer insulation film intervening between the passivation film and the thin-film resistor.

According to the acceleration sensor chip employing such a configuration, the passivation film formed on the outermost surface of the chip can suppress a breakage by an application of an external force.

In the aforementioned acceleration sensor chip, the connecting portions are formed around a center of the action portion so as to be symmetrical to the center of the action portion at four positions, and the high-potential electrode and the low-potential electrode are formed at diagonal positions on the support portion.

The acceleration sensor chip employing such a configuration has two pairs of connecting portions so that each pair becomes symmetrical around the action portion. Accordingly, the action portion can be supported by the support portion in the four directions in a well-balanced manner. Also, the high-potential electrode and the low-potential electrode are formed at diagonal positions, so that the wiring designing of the thin-film resistor to each electrode becomes easy.

In the aforementioned acceleration sensor chip, the action portion, the support portion and the connecting portion are functionally separated from one another by a first through-hole.

The acceleration sensor chip employing such a configuration causes the action portion and the support portion to be separated by the through-hole, so that an external force applied to the action portion is not distributed to the support portion, etc., but is concentrated on the strain detecting resistive elements. Accordingly, the external force applied to the action portion can be detected more precisely.

The aforementioned acceleration sensor chip, each of the connecting portions includes a region with a high rigidity and a region with a low rigidity.

According to the acceleration sensor chip employing such a configuration, when an external force is applied to the action portion, the region with a low rigidity absorbs excessive strain acting on the region with a high rigidity, thereby suppressing a strain of a whole force sensor chip originating from an application of a force or a moment in a direction. Therefore, a strain detecting resistive element corresponding to a force or a moment in a specific direction can be selectively caused to produce a strain, thereby remarkably suppressing interference in another axial direction.

In the aforementioned acceleration sensor chip, the region with a high rigidity and the region with a low rigidity are functionally separated from each other by a second through-hole.

According to the force sensor chip employing such a configuration, the region with a high rigidity and the region with a low rigidity are separated by the through-hole. Hence, an external force applied to the action portion is not dispersed to the support portion, etc., but is concentrated on the strain detecting resistive elements. Accordingly, the external force applied to the action portion can be detected more precisely.

DETAILED DESCRIPTION OF THE PREFERRED EMBODIMENTS

Figure 1:
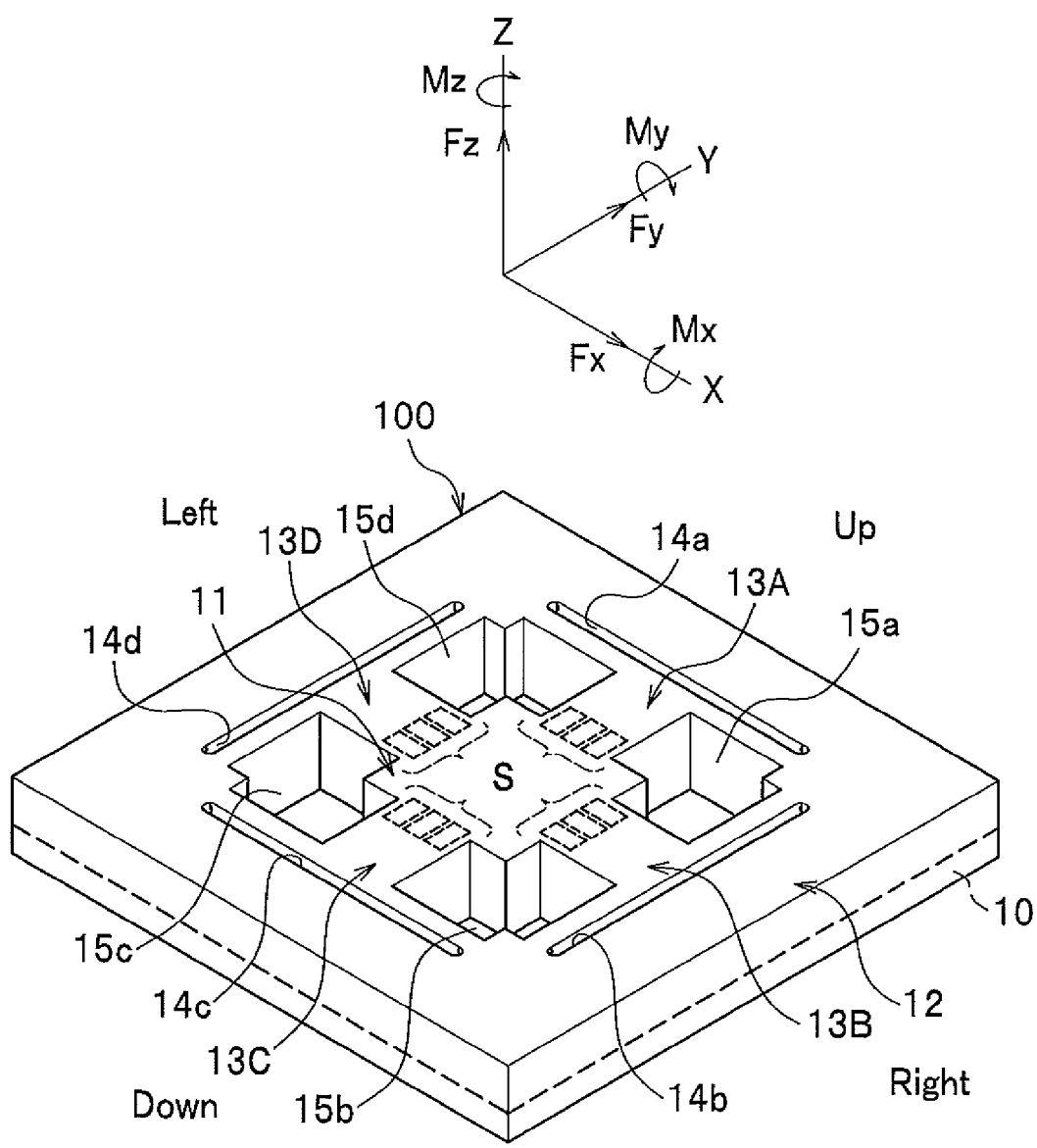
FIG. 1 is a perspective view showing a whole configuration of a force sensor chip according to first and second embodiments.
Figure 3:
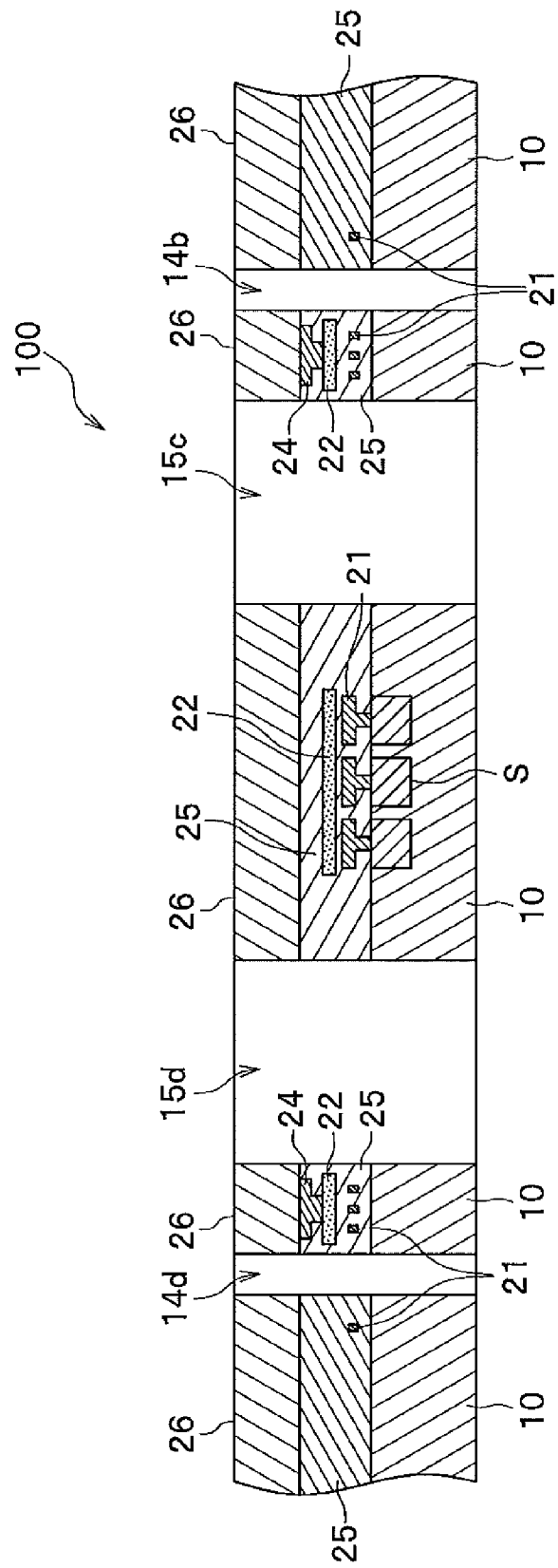
FIG. 3 is a schematic diagram showing a cross section of the force sensor chip according to the first embodiment, and is a cross-sectional view along a line A-A in FIG. 2.

An explanation will be given of a force sensor chip 100 according to a first embodiment of the present invention with reference to accompanying drawings. As shown in FIG. 1, the force sensor chip 100 realizes a sensor function of a force sensor that detects a force and a moment in each of the three axes (X axis, Y axis and Z axis) orthogonal to one another. As shown in FIGS. 1 and 3, the force sensor chip 100 employs a configuration in which various members and layers are stacked on a tabular base member 10. The stacked configuration of the force sensor chip 100 will be discussed in detail later.

Figure 2:
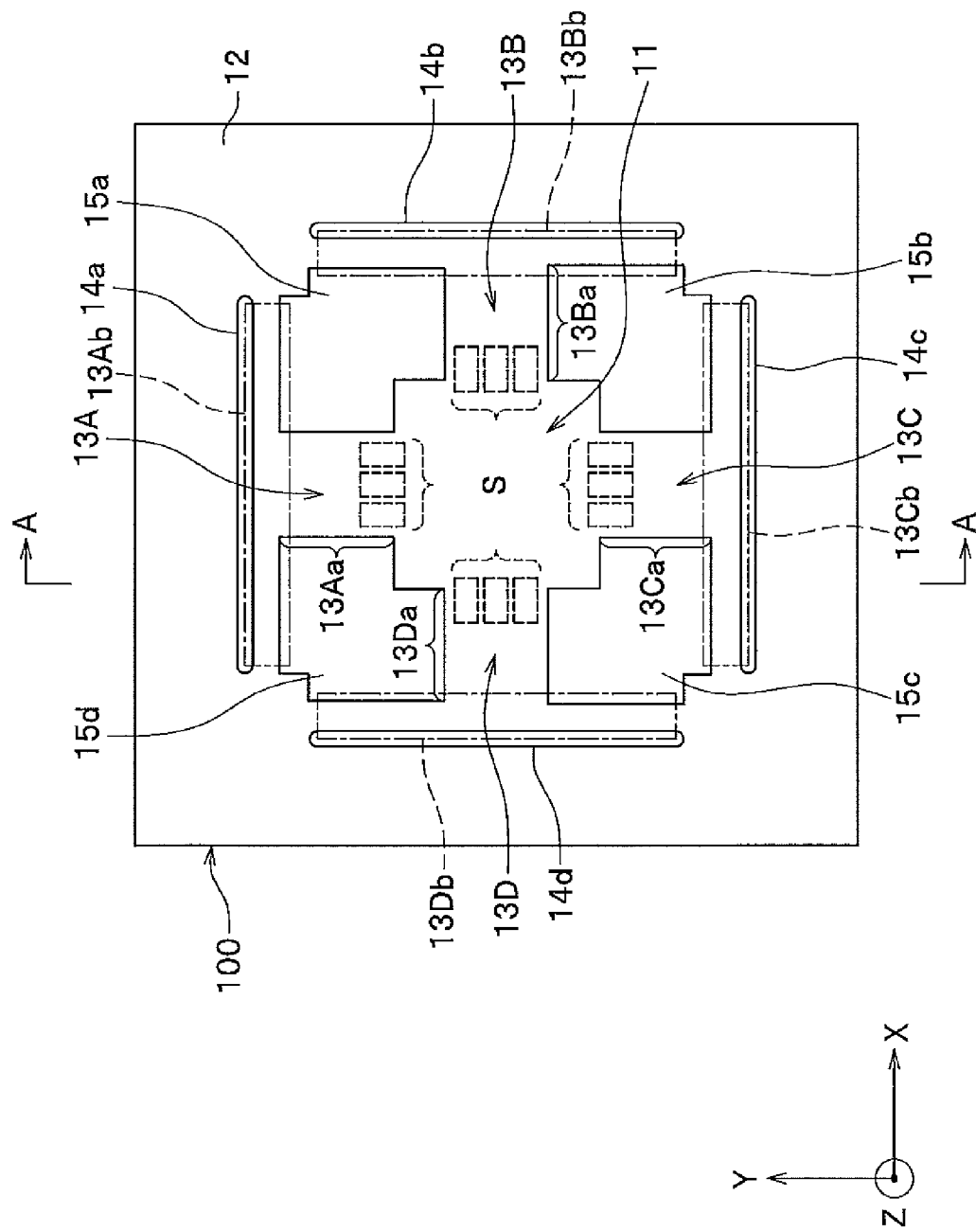
FIG. 2 is a plan view showing a whole configuration of the force sensor chip according to the first and second embodiments.

The base member 10 is a basal part of the force sensor chip 100. As shown in FIGS. 1 and 2, the base member 10 includes an action portion 11, a support portion 12, and connecting portions 13A, 13B, 13C, and 13D (hereinafter, referred to as connecting portions 13). Also, first through-holes 14a, 14b, 14c, and 14d and second through-holes 15a, 15b, 15c, and 15d are formed in the base member 10. The base member 10 can be comprised of, for example, a semiconductor substrate like a silicon.

The action portion 11 is a region where a force from the exterior (an external force) is applied. As shown in FIG. 2, the action portion 11 is formed in a square shape in this embodiment, and is formed at the center of the force sensor chip 100. The shape of the action portion 11 is not limited to a square as long as it can easily receive an external force, and, for example, can be a circular shape.

The support portion 12 is a region which supports the action portion 11 through the connecting portions 13. As shown in FIG. 2, the support portion 12 is formed in a rectangular frame like shape in this embodiment, and is formed around the action portion 11 and the connecting portions 13 so as to surround those portions. The shape of the support portion 12 is not limited to the rectangular frame like shape as long as it can support the action portion 11, and for example, can be a circular frame like shape.

The connecting portions 13 are regions interconnecting the action portion 11 and the support portion 12. As shown in FIG. 2, the connecting portions 13 are each formed between the action portion 11 and the support portion 12, and are each formed in a T-shaped beam. The shape of the connecting portion 13 is not limited to the T-shaped beam as long as it can interconnect the action portion 11 and the support portion 12, and for example, can be formed in a Y-shaped beam.

As shown in FIG. 2, it is preferable that the connecting portions 13 should be formed in such a manner as to correspond to respective four sides of the force sensor chip 100 so that the connecting portions 13 are symmetrical to the center of the action portion 11 at four positions. By forming the connecting portions 13 symmetrical to the center of the action portion 11 at four positions, the support portion 12 can support the action portion 11 in the four directions in a well-balanced manner.

As shown in FIG. 2, the connecting portions 13 respectively include two regions: bridge portions 13Aa, 13Ba, 13Ca, and 13Da; and elastic portions 13Ab, 13Bb, 13Cb, and 13Db. In FIG. 2, the bridge portions 13Aa, 13Ba, 13Ca, and 13Da are indicated by brackets with continuous lines, and the elastic portions 13Ab, 13Bb, 13Cb, and 13Db are indicated by rectangles with dashed lines.

As shown in FIG. 2, the bridge portions 13Aa, 13Ba, 13Ca, and 13Da have respective one ends in the lengthwise direction connected to the action portion 11, and have respective another ends connected to respective centers of corresponding elastic portions 13Ab, 13Bb, 13Cb, and 13Db. Also, as shown in FIG. 2, the elastic portions 13Ab, 13Bb, 13Cb, and 13Db have respective both ends in the lengthwise direction connected to the inner circumference of the support portion 12, and have respective centers connected to respective another ends of the bridge portions 13A*a*, 13B*a*, 13C*a*, and 13D*a*.

It is preferable that the bridge portions 13A*a*, 13B*a*, 13C*a*, and 13D*a* should be each formed as a region having a high rigidity, and the elastic portions 13A*b*, 13B*b*, 13C*b*, and 13D*b* should be each formed as a region having a low rigidity.

By forming the connecting portions 13 each divided into a region with a high rigidity and a region with a low rigidity, when an external force is applied to the action portion 11, the elastic portions 13A*b*, 13B*b*, 13C*b*, and 13D*b* absorb excessive strain working on the bridge portions 13A*a*, 13B*a*, 13C*a*, and 13D*a*, so that a strain of the force sensor chip 100 as a whole originating from an application of a force or a moment in one direction can be suppressed. Accordingly, a strain detecting resistive element S corresponding to a force or a moment in a specific direction can selectively produce a strain, thereby dramatically reducing interference in another axial direction.

The term "interference in another axial direction" is a phenomenon such that when a single force component is input, even though the input of other force components is "0", a measurement result does not become "0", i.e., a phenomenon that causes a measurement value of a force component to be varied by a force or a moment in another axis.

As shown in FIG. 2, the first through-holes 14*a*, 14*b*, 14*c*, and 14*d* are each a slit-like hole formed in the base member 10 so as to pass all the way therethrough. The first through-holes 14*a*, 14*b*, 14*c*, and 14*d* have a role of functionally separating the action portion 11, the support portion 12, and the connecting portions 13 from one another. By having such first through-holes 14*a*, 14*b*, 14*c*, and 14*d*, the force sensor chip 100 does not cause an external force applied to the action portion 11 to be dispersed to the support portion 12, etc., but can cause the external force to be concentrated on strain detecting resistive elements S to be discussed later, thereby detecting the external force applied to the action portion 11 more precisely.

As shown in FIG. 2, the second through-holes 15*a*, 15*b*, 15*c*, and 15*d* are each a substantially L-shaped hole formed in the base member 10 so as to pass all the way therethrough. The second through-holes 15*a*, 15*b*, 15*c*, and 15*d* have a role of functionally separating the bridge portions 13A*a*, 13B*a*, 13C*a*, and 13D*a* that are regions with a high rigidity and the elastic portions 13A*b*, 13B*b*, 13C*b*, and 13D*b* that are regions with a low rigidity. By having such second through-holes 15*a*, 15*b*, 15*c*, and 15*d*, the force sensor chip 100 does not cause an external force applied to the action portion 11 to be dispersed to the support portion 12, etc., but can cause the external force to be concentrated on the strain detecting resistive elements S to be discussed later, thereby detecting the external force applied to the action portion 11 more precisely.

Next, with reference to FIGS. 2 to 6, an explanation will be given of the internal configuration of the force sensor chip 100 according to the first embodiment. As shown in FIG. 3, the force sensor chip 100 employs a stacked-layer configuration including the base member 10, the strain detecting resistive elements S, resistive element wirings 21, thin-film resistors 22, thin-film-resistor wirings 24, an interlayer insulation film 25, and a passivation film 26.

The force sensor chip 100 having such a configuration can be produced by stacking individual layers on the surface of the base layer 10 through semiconductor manufacturing processes (e.g., etching like photo lithography, resist patterning, and film formation process, such as ion implantation, P-CVD, sputtering, and RIE).

The strain detecting resistive elements (piezo resistors) S are elements for detecting the magnitude of an external force and a direction thereof in the force sensor chip 100. The strain detecting resistive elements S are each comprised of a substance that changes a resistance value by deformation, and the magnitude of an external force and the direction thereof can be measured by detecting a change in the resistance value as an electrical signal. The strain detecting resistive elements S can be formed by, for example, ion implantation of a dopant like boron into the base member 10 through a semiconductor manufacturing process.

As shown in FIG. 3, the strain detecting resistive elements S are formed on the upper layer of the base member 10, and as shown in FIG. 2, plural (in the first embodiment, three) strain detecting resistive elements S are formed at a deformation producing portion of the base member 10 when an external force is applied, i.e., a deformation producing portion that is a connected portion between the action portion 11 and each connecting portion 13. As shown in FIG. 2, the deformation producing portion indicates the surroundings of the connection part between the action portion 11 and each of the bridge portions 13A*a*, 13B*a*, 13C*a*, and 13D*a* where a strain originating from an external force applied to the action portion 11 most often happens. As shown in FIG. 2, the strain detecting resistive elements S are each formed so as to be parallel to the lengthwise axis of each of the bridge portions 13A*a*, 13B*a*, 13C*a*, and 13D*a*.

The resistive-element wirings 21 are for connecting each strain detecting resistive element S, a signal electrode 27*a* to be discussed later, and a GND electrode 27*b* to be discussed later, etc. As shown in FIG. 3, the resistive-element wirings 21 are formed at the upper layer of the strain detecting resistive element S so as to have a T-shaped cross section. The cross-sectional shape of the resistive-element wiring 21 is not limited to the foregoing shape as long as it can electrically connect the strain detecting resistive element S, the signal electrode 27*a*, and the GND electrode 27*b*, etc., to be discussed later. How to connect the strain detecting resistive element S, the signal electrode 27*a*, and the GND electrode 27*b*, etc., by the resistive-element wiring 21 will be discussed in detail later.

The thin-film resistors 22 are for heating respective strain detecting resistive elements S by resistive heat generated by a current flow. As shown in FIG. 3, the thin-film resistors 22 are formed at upper layers in the vicinity of respective strain detecting resistive elements S with the resistive-element wirings 21 and the interlayer insulation film 25 to be discussed later intervening. Also, as shown in FIG. 3, the thin-film resistors 22 are formed at a portion facing the plurality of strain detecting resistive elements S so as to face thereto with a predetermined clearance.

The thin-film resistors 22 can sufficiently heat the strain detecting resistive elements S by resistive heat generated by a current flow if such thin-film resistor is at least partially formed at the upper layer of the strain detecting resistive elements S. Accordingly, each of the thin-film resistors 22 is formed so as to face three strain detecting resistive elements S with a predetermined clearance so that the thin-film resistor 22 faces some of or all of respective areas of the three strain detecting resistive elements S formed in the connecting portion 13A shown in, for example, FIG. 2.

Figure 4:
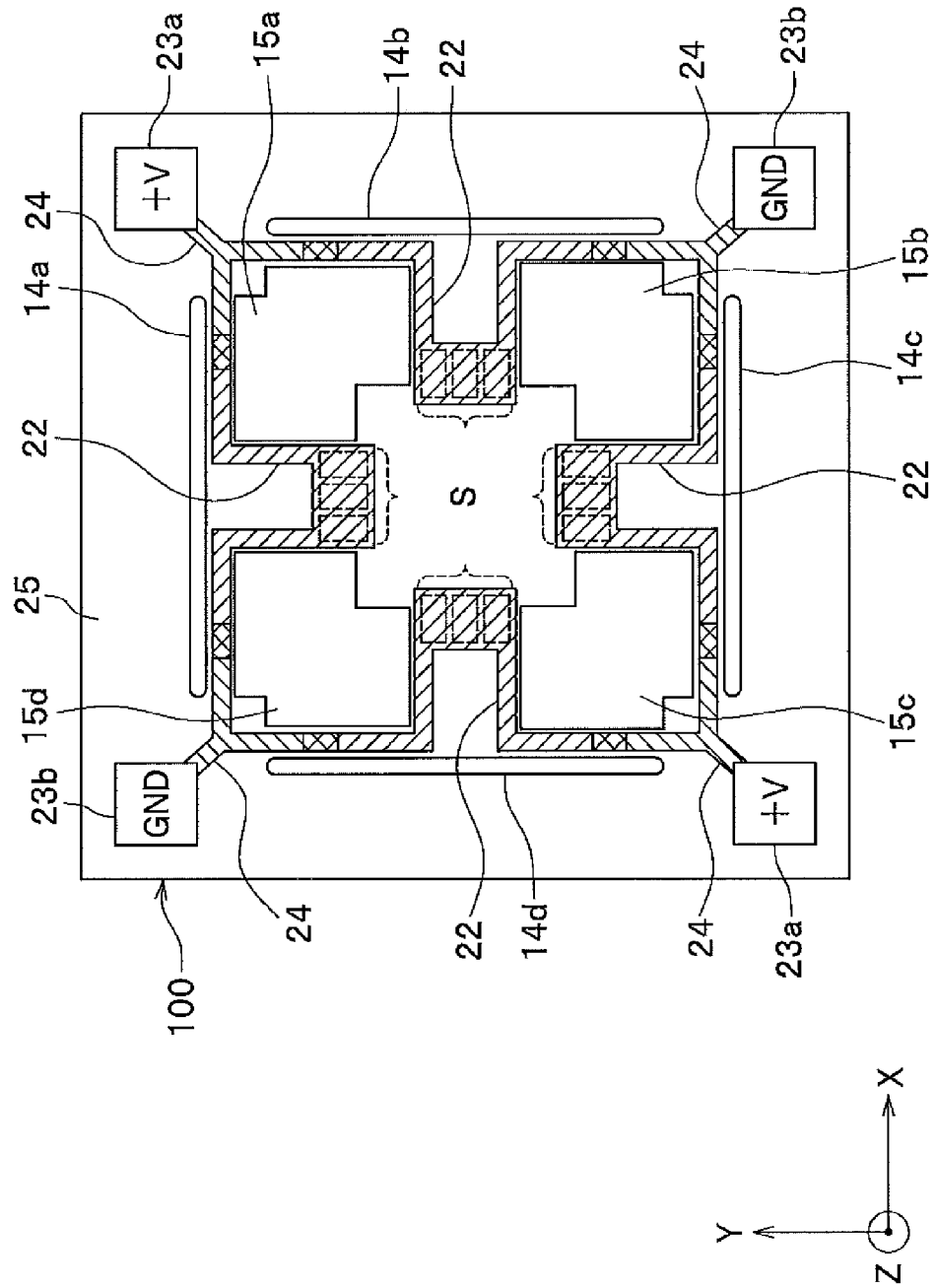
FIG. 4 is a schematic diagram showing a thin-film resistor of the force sensor chip according to the first embodiment and a wiring condition of such thin-film resistor, and is a plan view of the force sensor chip shown in FIG. 2 without a passivation film and an interlayer insulation film on the thin-film resistor.

However, it is desirable that each thin-film resistor 22 should be formed to have an area covering the plural strain detecting resistive elements S in a planar view as shown in FIG. 4. The "area covering the plural strain detecting resistive elements S" means a total area covering the three strain detecting resistive elements S formed in, for example, the connecting portion 13A shown in FIG. 2 and all pitched portions between respective two strain detecting resistive elements. Hence, it is fine if each thin-film resistor 22 is formed so as to completely match the total area covering the three strain detecting resistive elements S and the pitched portions between respective two strain detecting resistive elements. Alternatively, as shown in FIG. 4, each thin-film resistor 22 may be formed so as to be larger than that total area. The shape of the thin-film resistor 22 is not limited to a substantially rectangular shape shown in FIG. 4, but can be a square shape, a circular shape, and rhomboid shape, etc., in accordance with the shape of the base member 10 and the wiring condition thereof.

Also, as shown in FIG. 4, the thin-film resistor 22 has one end connected to a high-potential electrode 23a through the thin-film-resistor wiring 24, and has another end connected to a low-potential electrode 23b through the thin-film-resistor wiring 24.

When a voltage is applied across the high-potential electrodes 23a and the low-potential electrodes 23b to the thin-film resistors 22, resistive heat is generated, which is transferred to the strain detecting resistive elements S through the interlayer insulation film 25 and the resistive-element wirings 21. Accordingly, by having the thin-film resistors 22, the force sensor chip 100 can promote heat generation of the strain detecting resistive elements S right after sensor activation, and can remarkably reduce a time until such resistive elements become a steady condition after application of the voltage.

As explained above, because the thin-film resistors 22 are formed at the vicinity (upper layer) facing the strain detecting resistive elements S, the resistive heat can be transferred to the strain detecting resistive elements S without a time lag. Also, as explained above, because the thin-film resistors 22 are formed to have an area that covers the plural strain detecting resistive elements S, the plural strain detecting resistive elements can be heated without a varying in the temperature. Accordingly, by having such thin-film resistors 22, the force sensor chip 100 can suppress a power consumption at minimum when promoting heat generation of the strain detecting resistive elements S, and can suppress a deformation of the base member 10 originating from excessive heat.

The high-potential electrode 23a and the low-potential electrode 23b are electrodes formed on the support portion 12, and cause the thin-film resistors 22 to generate resistive heat by applying a voltage thereto. By applying a voltage to the thin-film resistors 22 through the high-potential and low-potential electrodes 23a and 23b right after sensor activation, the force sensor chip 100 can promote the strain detecting resistive elements S to generate heat by the resistive heat of the thin-film resistors 22, and can remarkably reduce a time until the temperature of the strain detecting resistive elements S becomes steady after application of a voltage.

As shown in FIG. 4, it is preferable that a pair of high-potential electrodes 23a and a pair of low-potential electrodes 23b should be formed on the support member 12 at positions diagonal to each pair. By forming and arranging the high-potential electrodes 23a and the low-potential electrodes 23b in such a positional relationship, the designing of wirings between the thin-film resistors 22 and respective electrodes becomes easy.

As explained above, the thin-film-resistor wirings 24 are for electrically connecting the thin-film resistors 22 to the high-potential electrodes 23a and the low-potential electrodes 23b. As shown in FIG. 3, the thin-film-resistor wirings 24 are formed at the upper layer of the thin-film resistors 22. Also, as shown in FIG. 4, the thin-film-resistor wirings 24 are formed along the second through-holes 15a, 15b, 15c, and 15d in a planar view, have respective one ends connected to the high-potential electrode 23a or the low-potential electrode 23b, and have respective another ends connected to the thin-film resistors 22.

The interlayer insulation film 25 is a film (a layer) for electrically isolating the thin-film resistors 22 and the resistive-element wirings 21 from each other. As shown in FIG. 3, the interlayer insulation film 25 is formed so as to cover the base member 10, the strain detecting resistive elements S, the resistive-element wirings 21 and the thin-film resistors 22. The interlayer insulation film 25 is, for example, an oxide film.

The passivation film 26 is a film (a layer) for protecting the force sensor chip 100. As shown in FIG. 3, the passivation film 26 is formed at the upper layer of the thin-film resistors 22 with the interlayer insulation film 25 intervening therebetween. The passivation film 26 is, for example, a nitride film. By having the passivation film 26 on the outermost surface of the chip, the force sensor chip 100 can suppress a breakage originating from an application of an external force.

Next, with reference to FIGS. 5 and 6, a detailed explanation will be given of a configuration around the strain detecting resistive elements S (Sxa1, Sxa2, Sxa3, Sxb1, Sxb2, Sxb3, Sya1, Sya2, Sya3, Syb1, Syb2, and Syb3) of the force sensor chip 100 according to the first embodiment and the wiring conditions of individual elements and electrodes. The wiring conditions of individual elements and electrodes in FIG. 5 are simplified due to scale reduction.

Figure 5:
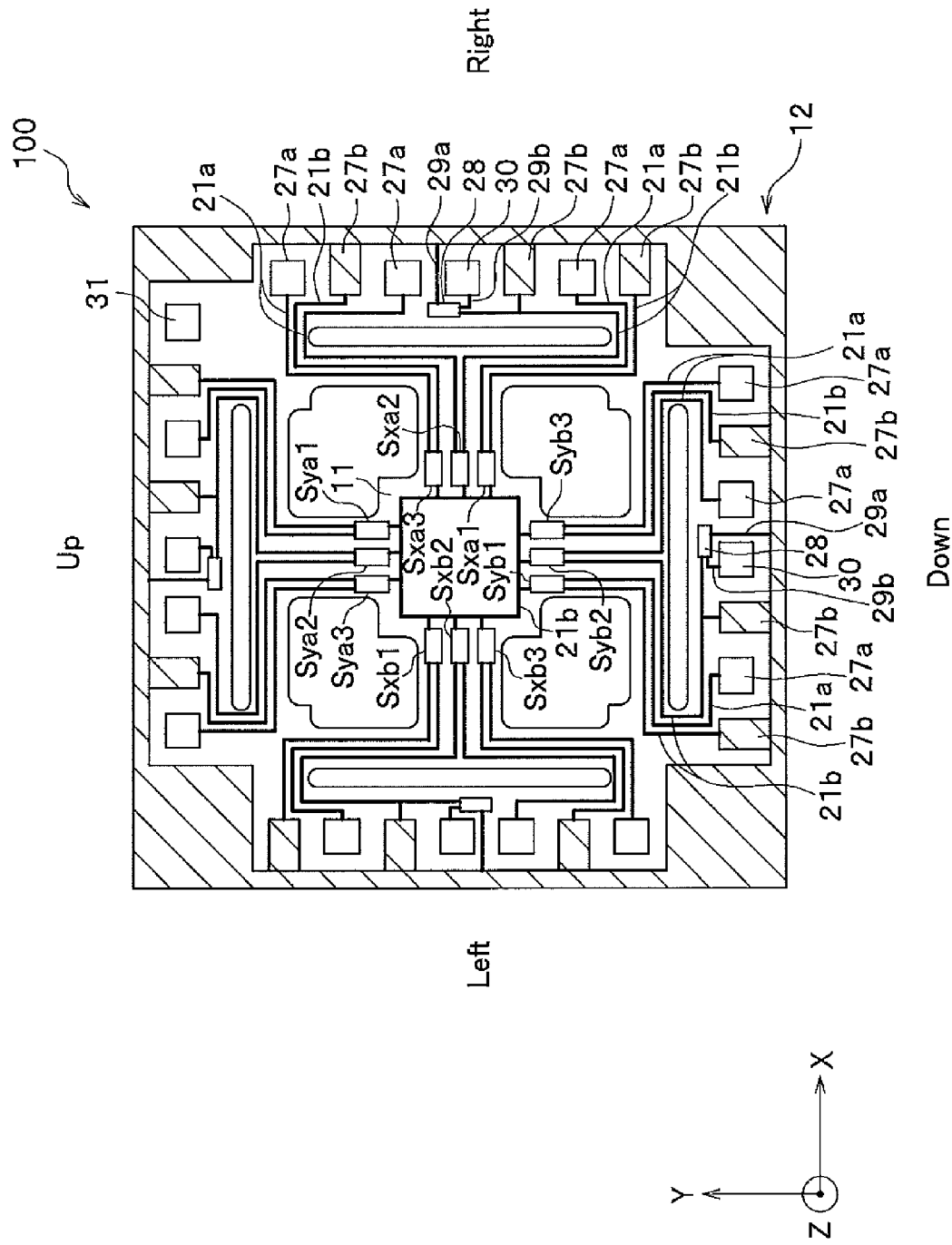
FIG. 5 is a schematic diagram showing a strain detecting resistive element of the force sensor chip according to the first and second embodiments and a wiring condition of such resistive element, and is a plan view of the force sensor chip shown in FIG. 2 without a passivation film, an interlayer insulation film, a thin-film resistor, a thin-film-resistor wiring, and a wiring on the strain detecting resistive element.

As shown in FIG. 5, formed on the support portion 12 around the strain detecting resistive elements S of the force sensor chip 100 are signal electrodes 27a, GND electrodes 27b, temperature-compensation resistive elements 28, and temperature-compensation electrodes 30.

The signal electrodes 27a and the GND electrodes 27b are for applying a voltage to the strain detecting resistive elements S. The signal electrodes 27a are connected to respective one ends of the strain detecting resistive elements S through resistive-element wirings 21a. The resistive-element wirings 21a are connected to an AD converter 32 (see FIGS. 7A to 8B) inside/outside the sensor as will be discussed later. Accordingly, a resistance value is measured based on current/voltage characteristic of each strain detecting resistive element S, and an applied external force is analyzed. Also, the GND electrodes 27b are connected to respective another ends of the strain detecting resistive elements S through resistive-element wirings 21b.

As shown in FIG. 5, the signal electrodes 27a, 27a, and 27a arranged at the right of the support portion 12 are connected to respective strain detecting resistive elements Sxa1, Sxa2, and Sxa3 through the resistive-element wirings 21a, 21a, and 21a. Also, as shown in FIG. 5, the signal electrodes 27a, 27a, and 27a arranged at the lower side of the support portion 12 are connected to respective strain detecting resistive elements Syb1, Syb2, and Syb3 through the resistive-element wirings 21a, 21a, and 21a. The reference numerals are omitted in the figure but the signal electrodes 27a, 27a, and 27a arranged at the left and the upper side of the support portion 12 are wired in the same manner.

As shown in FIG. 5, the GND electrodes 27b, 27b, and 27b arranged at the right of the support portion 12 are connected to respective strain detecting resistive elements Sxa1, Sxa2 and Sxa3 through the resistive-element wirings 21b, 21b, and 21b. Also, as shown in FIG. 5, the GND electrodes 27b, 27b, and 27b arranged at the lower side of the support portion 12 are connected to respective strain detecting resistive elements Syb1, Syb2, and Syb3 through the resistive-element wirings 21b, 21b, and 21b. The reference numerals are omitted in the figure but the GND electrodes 27b, 27b, and 27b arranged at the left and the upper side of the support portion 12 are wired in the same manner.

Figure 6:
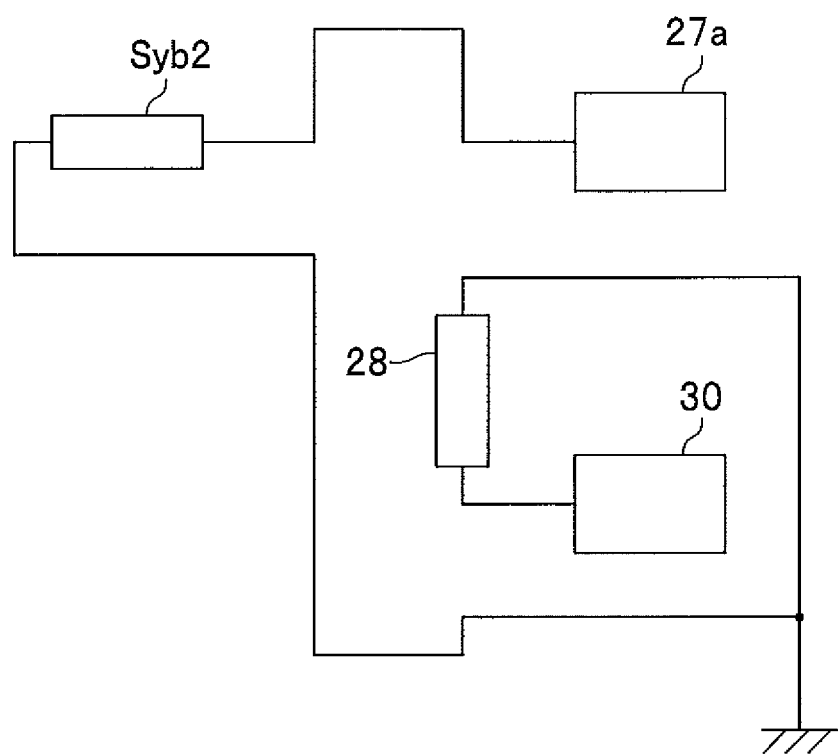
FIG. 6 is a schematic diagram showing actual wiring conditions among a strain detecting resistive element Syb2 in FIG. 5, each element and each electrode.

FIG. 6 shows actual wirings among the strain detecting resistive element Syb2 shown in FIG. 5, each element and each electrode. As shown in FIG. 6, respective one ends of the strain detecting resistive element S and the temperature-compensation resistive element 28 are connected to the ground potential GND. Moreover, another end of the strain detecting resistive element S is connected to the signal electrode 27a, and another end of the temperature-compensation resistive element 28 is connected to the temperature-compensation electrode 30. It is not illustrated in FIG. 6 but the other strain detecting resistive elements Sxa1, Sxa2, Sxa3, Sxb1, Sxb2, Sxb3, Sya1, Sya2, Sya3, Syb1, and Syb3 are wired in the same manner.

The temperature-compensation resistive elements 28 are for compensating respective temperatures of the strain detecting resistive elements S. The temperature-compensation resistive elements 28 each comprise the same element as that of the strain detecting resistive element S, and as shown in FIG. 5, are formed on the support portion 12 which is not affected by a strain originating from an application of an external force. The temperature-compensation resistive element 28 has one end connected to the temperature-compensation electrode 30 through a temperature-compensation wiring 29b, and has another end connected to a ground potential through a temperature-compensation wiring 29a. The one end of the temperature-compensation resistive element 28 is connected to the strain detecting resistive element S through the resistive-element wiring 21b, and is connected to a ground potential (not illustrated). Also, the temperature-compensation resistive element 28 is connected to the AD converter 32 to be discussed later, so that a strain detection signal generated by the temperature-compensation resistive element 28 is input to the AD converter 32 (see FIGS. 7A to 8B).

The temperature-compensation wirings 29a and 29b are for connecting the temperature-compensation resistive elements 28 to the temperature-compensation electrodes 30 and to the ground potential (not illustrated). The temperature-compensation electrodes 30 are for applying a voltage to the temperature-compensation resistive elements 28.

The force sensor chip 100 obtains a ratio between the resistance value when a predetermined voltage is applied to the temperature-compensation electrodes 30 and the resistance value in the case of a room temperature, thereby compensating respective temperatures of the strain detecting resistive elements Sxa2, Sxb2, Sya2, and Syb2 based on a surrounding temperature. That is, the force sensor chip 100 is capable of always correcting measurement results of changes in respective resistance value of the strain detecting resistive elements Sxa2, Sxb2, Sya2 and Syb2 for external force measurement based on a change in the resistance value of the temperature-compensation resistive elements 28 which are not affected by application of an external force by having the temperature-compensation resistive elements 28 and the temperature-compensation electrodes 30. Accordingly, the force sensor chip 100 can measure a force and a moment without being affected by a surrounding temperature. Note that twelve temperature-compensation resistive elements 28 may be formed relative to all strain detecting resistive element S like a force sensor chip 102 of a third embodiment to be discussed later (see FIG. 13).

A bias electrode 31 is for applying a biasing voltage supplied from an external power source (not illustrated) to the base member 10. Application of such a biasing voltage through the bias electrode 31 causes a depletion layer to develop at the boundary face of the strain detecting resistive element S, so that the strain detecting resistive element S is electrically isolated from the base member 10 and adjoining strain detecting resistive elements S are electrically isolated from each other. Accordingly, generation of a leak current between two strain detecting resistive elements S is suppressed, thereby reducing an effect of a current noise. Also, by electrically setting the base member 10 to be a constant potential, varying of a potential can be suppressed and a noise tolerance can be improved, and a change level of a resistance based on the piezo effect corresponding to a strain of the strain detecting resistive element S formed at the upper layer of the connecting portion 13 can be measured highly precisely.

Next, with reference to FIGS. 7A to 8B, an electrical connection between the strain detecting resistive element S and the temperature-compensation resistive element 28 in the force sensor chip 100 according to the first embodiment will be briefly explained. As shown in the circuit diagram of FIG. 7A, the force sensor chip 100 has the strain detecting resistive element S and the temperature-compensation resistive element 28 both configuring a half-bridge circuit HB corresponding to the lower half of a bridge circuit. The strain detecting resistive element S shown in FIG. 7A indicates each of the strain detecting resistive elements Sxa2, Sxb2, Sya2, and Syb2.

In the half-bridge circuit HB, respective one ends (lower side of FIG. 7A) of the strain detecting resistive element S and the temperature-compensation resistive element 28 are connected together, and are connected to the ground potential GND. Also, respective another ends (upper side of FIG. 7A) of the strain detecting resistive element S and the temperature-compensation resistive element 28 are connected to the signal electrode 27a and the temperature-compensation electrode 30, respectively. The signal electrode 27a and the temperature-compensation electrode 30 are connected to respective external resistors provided outside the chip, so that a bridge circuit is configured.

Figure 7A:
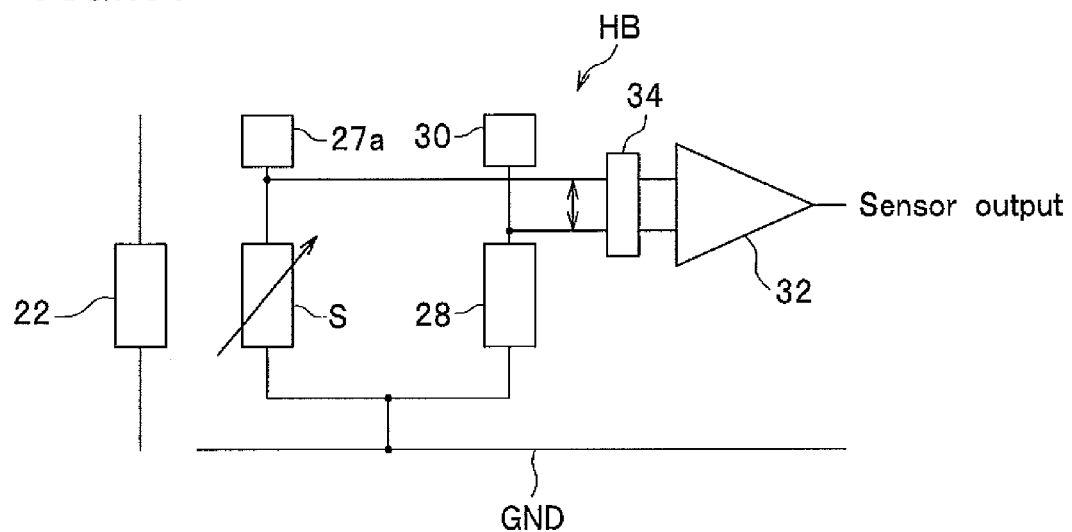
FIG. 7A is a circuit diagram of an electrical connection when an LPF and an AD converter are built in the chip of a force sensor according to first, second, and third embodiments, and is a diagram showing a half-bridge circuit.

Also, in the half-bridge circuit HB, the strain detecting resistive element S and the temperature-compensation resistive element 28 are connected to an LPF (Low Pass Filter) 34 and the AD converter 32 both built in the sensor as shown in FIG. 7A, so that respective strain detection signals generated by the strain detecting resistive element S and the temperature-compensation resistive element 28 are input into the AD converter 32.

Figure 8A:
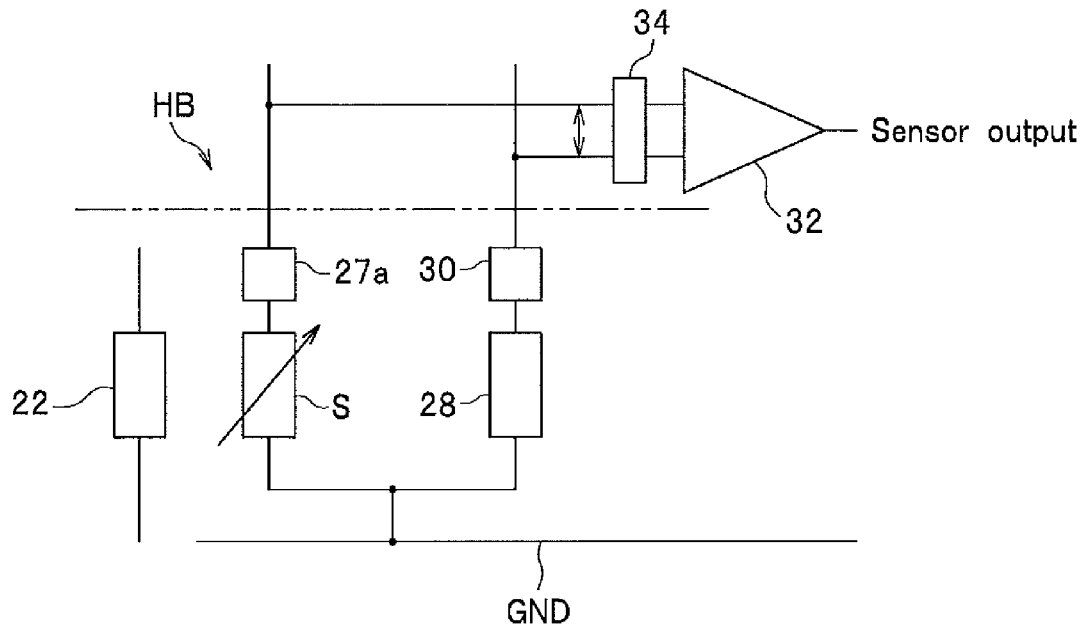
FIG. 8A is a circuit diagram of an electrical connection when an LPF and an AD converter are built at the exterior of the chip of a force sensor according to the first, second, and third embodiments, and is a diagram showing a half-bridge circuit.

Also, as shown in FIG. 8A, the strain detecting resistive element S and the temperature-compensation resistive element 28 can be connected to the LPF (Low Pass Filter) 34 and the AD converter 32 arranged on an analog substrate (not illustrated) outside the sensor, so that respective strain detection signals generated by the strain detecting resistive element S and the temperature-compensation resistive element 28 are input into the AD converter 32.

Figure 9:
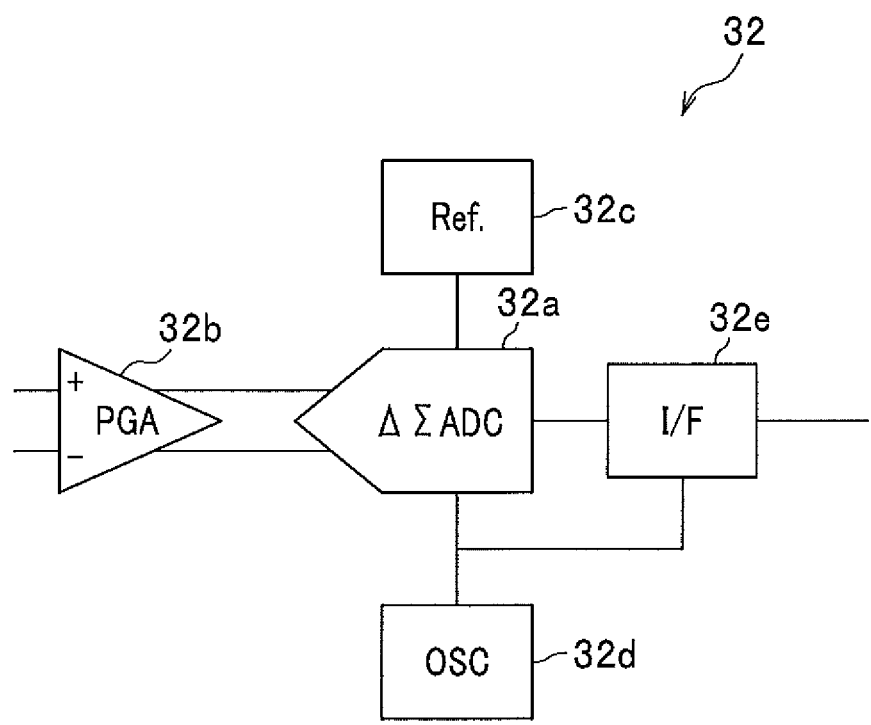
FIG. 9 is a schematic diagram showing a specific configuration of an AD converter.

More specifically, as shown in FIG. 9, the AD converter 32 includes ΔΣ AD converter (digital sigma AD converter) 32a that performs AD conversion on a strain detection signal, a PGA (Programmable Gain Amplifier) 32b that obtains a difference between two strain detection signals, an Ref (Reference) 32c that applies a reference voltage, an OSC (Oscillator) 32d that oscillates a timing pulse for AD conversion, and an I/F (interface) 32e.

The ΔΣ AD converter 32a is a converter which converts an analog signal into a digital signal and which realizes a low power consumption, a high-speed clock operation, and a high SNR (signal-to-noise ratio) in comparison with general AD converters. The configuration of AD converter 32 including the ΔΣ AD converter 32a is conventionally well known, so that the detailed explanation of the function, operation, etc., of such AD converter will be omitted.

According to the half-bridge circuit HB having the above-explained configuration, when strain detection signals generated by the strain detecting resistive element S and the temperature-compensation resistive elements 28 are input into the AD converter 32, the AD converter 32 obtains a difference between the two strain detection signals, calculates a stain detection signal having undergone a temperature compensation, and performs AD conversion on the strain detection signal having undergone the temperature compensation in order to generate a digital value. Also, the AD converter 32 inputs the strain detection signal having undergone the AD conversion to a computer, etc., outside the sensor for an arithmetic processing. The computer calculates a precise external force applied to the support portion 12.

Also, in the half-bridge circuit HB, a strain detection signal output by the temperature-compensation resistive element 28 is input into a monitor device, etc., (not illustrated) outside the sensor, so that it is monitored whether or not the temperature-compensation resistive element 28 is normally operating.

Figure 7B:
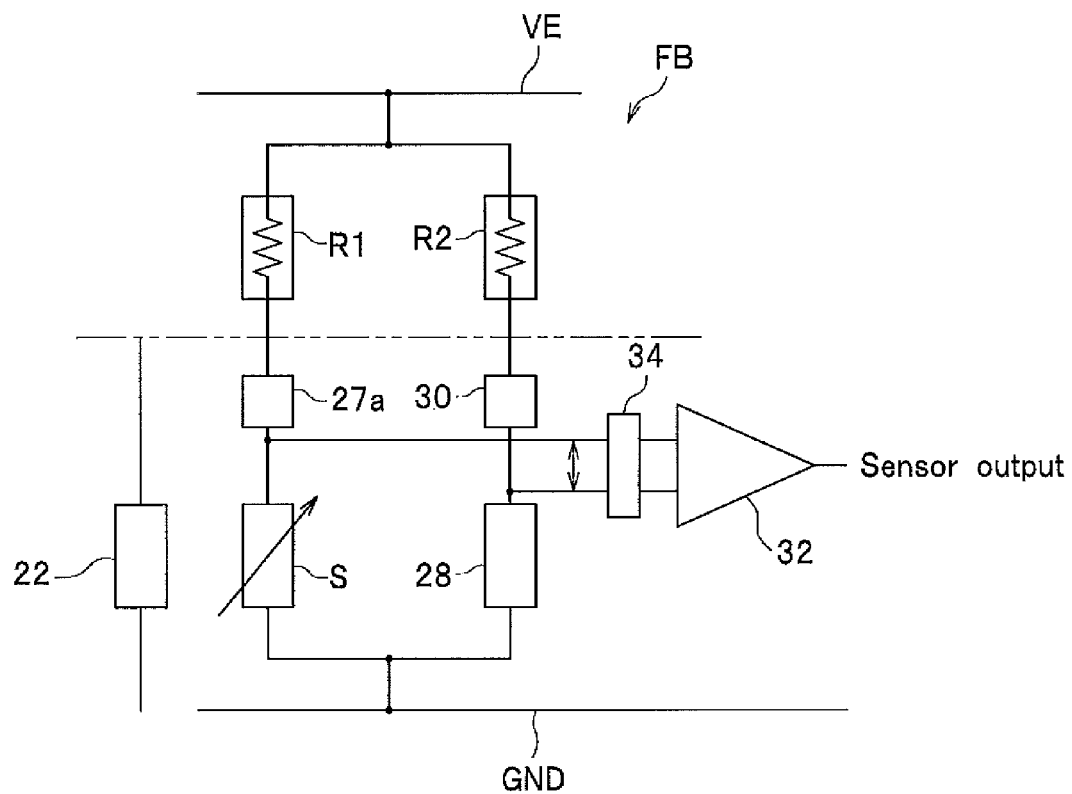
FIG. 7B is a circuit diagram of an electrical connection when an LPF and an AD converter are built in the chip of a force sensor according to first, second, and third embodiments, and is a diagram showing a full-bridge circuit.

As shown in the circuit diagram of FIG. 7B, the force sensor chip 100 may have external resistors R1 and R2 which are connected to the signal electrode 27a and the temperature-compensation electrode 30, respectively, of the half-bridge circuit HB and which are provided in the chip so as to configure a full-bridge circuit FB. In the full-bridge circuit FB, as shown in FIG. 7B, respective one ends (lower side of FIG. 7B) of the strain detecting resistive element S and the temperature-compensation resistive element 28 are connected together and are connected to the ground potential GND. Also, respective another ends (upper side of FIG. 7B) of the strain detecting resistive element S and the temperature-compensation resistive element 28 are connected to respective one ends (lower side of FIG. 7B) of the signal electrode 27a and the temperature-compensation electrode 30. Respective another ends (upper side of FIG. 7B) of the signal electrode 27a and the temperature-compensation electrode 30 are connected to respective external resistors R1 and R2, and then connected together, and further connected to a power-source voltage VE outside the sensor.

In the full-bridge circuit FB, as shown in FIG. 7B, the strain detecting resistive element S and the temperature-compensation resistive element 28 are connected to the LPF (Low Pass Filter) 34 and the AD converter 32 both built in the sensor, so that respective strain detection signals output by the strain detecting resistive element S and the temperature-compensation resistive element 28 are input into the AD converter 32.

Figure 8B:
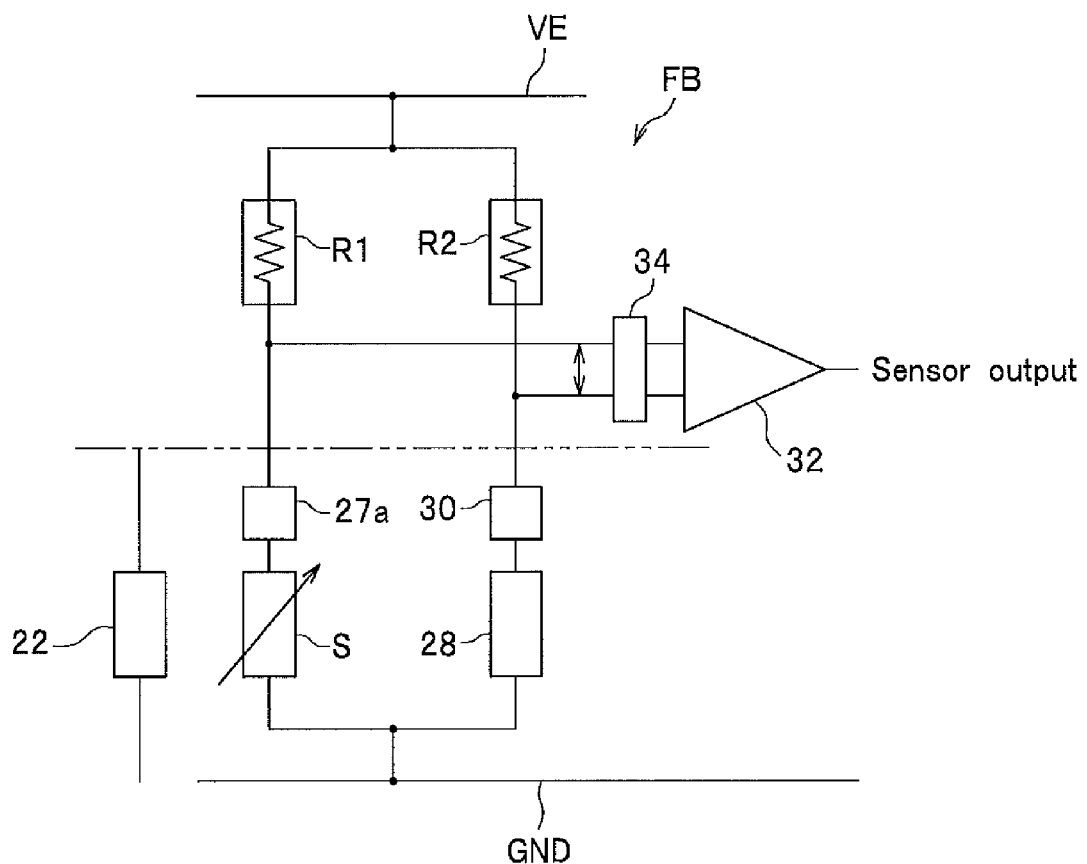
FIG. 8B is a circuit diagram of an electrical connection when an LPF and an AD converter are built at the exterior of the chip of a force sensor according to the first, second, and third embodiments, and is a diagram showing a full-bridge circuit.

Also, as shown in FIG. 8B, the strain detecting resistive element S and the temperature-compensation resistive element 28 may be connected to the LPF (Low Pass Filter) 34 and the AD converter 32 arranged on an analog substrate (not illustrated) outside the sensor, so that respective strain detection signals output by the strain detecting resistive element S and the temperature-compensation resistive element 28 are input into the AD converter 32.

By configuring such a full-bridge circuit FB, the force sensor chip 100 can cancel, from a change in the resistance value of the strain detecting resistive element S, a change in the resistance value originating from a temperature change, and can appropriately pick up only a change in the resistance value of the strain detecting resistive element S originating from an application of an external force. Accordingly, an external force applied to the action portion 11 can be detected more precisely.

Figures 10A, 10B, 10C:
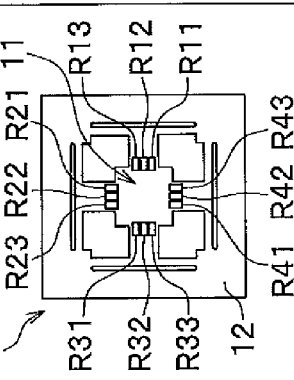
FIG. 10 is a diagram showing an operation of the force sensor chip according to the first and second embodiments.

Next, with reference to FIG. 10, an explanation will be briefly given of an operation of the force sensor chip 100 according to the first embodiment, i.e., an example method of detecting the magnitude of an external force and the direction thereof. In order to simplify the explanation, each deformation pattern 42 shown in FIG. 10 indicates a deformation in an inflated manner. In the following explanation, it is presumed that a force in the X axis direction in the three axes (X axis, Y axis and Z axis) of the Cartesian coordinate system is Fx, a force in the Y axis direction is Fy, and a force in the Z axis direction is Fz. Also, it is presumed that a moment given in the rotational direction to the X axis is Mx, a moment given in the rotational direction to the Y axis is My, and a moment given in the rotational direction to the Z axis is Mz.

When an external force (an axial force) including components Fx[N], Fy[N], Fz[N], Mx[N·cm], My[N·cm] and Mz[N·cm] is applied to the action portion 11 of the force sensor chip 100, the connecting portions 13 deform depending on the magnitude of such an external force. Hence, together with such deformation of the connecting portions 13, the strain detecting resistive elements S also deform, and by analyzing strain detection signals in accordance with such a deformation, the magnitude of the external force and the direction thereof can be detected.

An external-force transfer member (not illustrated) that transfers an external force applied to an external structure (e.g., a peripheral end portion of a manipulator) is connected to the action portion 11, and the external force is applied to the action portion 11 of the force sensor chip 100. At this time, when the casing of the sensor is provided with a damping mechanism that attenuates the external force applied to the external structure, the dynamic range of the sensor can be increased.

When any one of the six external force components or a combination thereof is applied to the action portion 11 at the chip center of the force sensor chip 100, the action portion 11 where the external force is applied is supported by the support portion 12 and the connecting portions 13, but changes its position. As a result, the connecting portions 13 connecting the action portion 11 and the support portion 12 together produce inherent deformation in accordance with the applied external force. When the connecting portions 13 are deformed, unique strain detection signals depending on how the connecting portions 13 are deformed are output.

In FIG. 10, the kind of an external force applied to the action portion 11 is indicated in the field A, a deformation pattern at that time is indicated in the field B, and a strain detection signal characteristic to the applied external force is indicated in the field C. The deformation pattern of the force sensor chip 100 is represented by a deformation pattern 41 in a planar view and a deformation pattern 42 in a cross-sectional view. Also, a strain detection signal is expressed as an arithmetic expression for increase/decrease of the resistance value. Respective resistance changes R11, R12, R13, R21, R22, R23, R31, R32, R33, R41, R42, and R43 used in the arithmetic expression for increase/decrease of the resistance value are shown so as to correspond to the twelve strain detecting resistive elements (Sxa1, Sxa2, Sxa3), (Sxb1, Sxb2, Sxb3), (Sya1, Sya2, Sya3), and (Syb1, Syb2, Syb3) as (R11, R12, R13), (R31, R32, R33), (R21, R22, R23) and (R41, R42, R43).

As shown in FIG. 10, when the external force Fx is applied, a force indicated by an arrow 43 is applied, and a strain detection signal expressed by an arithmetic expression ((R21−R23)+(R43−R41))/4 can be obtained as an output signal. When the external force Fz is applied, a force indicated by an arrow 44 is applied, and a strain detection signal expressed by an arithmetic expression $-(R12+R22+R32+R42)/4$ can be obtained as an output signal. When the external force My is applied, a force indicated by an arrow 45 is applied, and a strain detection signal expressed by an arithmetic expression $(R12-R32)/2$ can be obtained as an output signal. When the external force Mz is applied, a force indicated by an arrow 46 is applied, and a strain detection signal expressed by an arithmetic expression $((R13-R11)+(R23-R21)+(R33-R31)+(R43-R41))/8$ can be obtained as an output signal. When such strain detection signals are appropriately operated through, for example, a conventionally well known matrix operation, an external force applied to the action portion 11 of the force sensor chip 100 can be known.

When the force sensor chip 100 having the above-explained configuration operates, a predetermined time is necessary until the temperature of the strain detecting resistive elements S becomes steady and the operation thereof becomes stable after a driving voltage is applied to the sensor. However, the force sensor chip 100 has the thin-film resistors 22 arranged in the vicinity of (at the upper layers of) the strain detecting resistive elements S, so that by applying a voltage to the thin-film resistors 22 simultaneously with the activation of the sensor, the resistive heat can be transferred to the strain detecting resistive elements S without a time lag. Accordingly, the self-heat-generation of the strain detecting resistive element S can be promoted, and a time until the temperature of the strain detecting resistive element S becomes steady after application of a voltage can be remarkably reduced.

Next, with reference to FIGS. 11 and 12, an explanation will be given of a force sensor chip 101 according to a second embodiment in detail. The force sensor chip 101 of the second embodiment has the same configuration as that of the force sensor chip 100 except the area of the thin-film resistor 22 stacked on the base member 10 and the pathway of the thin-film-resistor wiring 24. Hence, the same structural element as that of the force sensor chip 100 will be denoted by the same reference numeral, and the duplicated explanation thereof will be omitted.

The force sensor chip 101 of the second embodiment has the same whole configuration (see FIGS. 1 and 2), strain detecting resistive elements S, wiring conditions thereof (see FIG. 5), circuit diagrams (see FIGS. 7A and 7B) indicating electrical connections, and operation (see FIG. 10) as those of the force sensor chip 100 of the first embodiment, so that the duplicated explanation thereof is also omitted.

Figure 11:
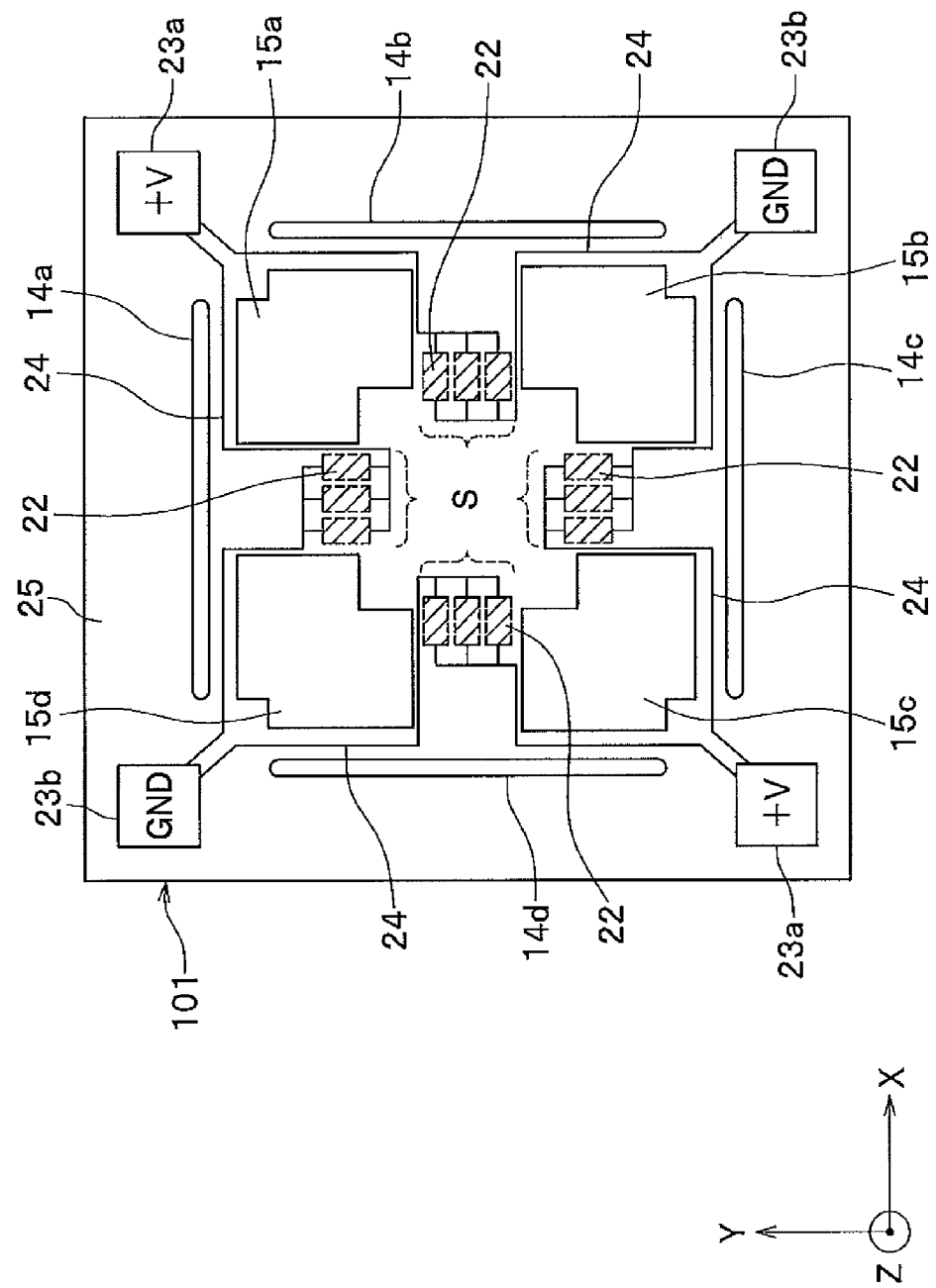
FIG. 11 is a schematic diagram showing a thin-film resistor of the force sensor chip according to the second embodiment and a wiring condition of such resistor, and is a plan view of the force sensor chip shown in FIG. 2 without a passivation film, an interlayer insulation film on the thin-film resistor and a thin-film resistor wiring.

As shown in FIG. 11, the force sensor chip 101 has the thin-film resistors 22 with the same area as that of each strain detecting resistive element S in a planar view, and the same number of thin-film resistors 22 as that of the strain detecting resistive elements S are formed. Also, as shown in FIG. 11, each thin-film resistor 22 is formed so as to face the strain detecting resistive element S with a predetermined clearance.

The description "the same area as that of each strain detecting resistive element S" means that the thin-film resistor 22 has, as shown in FIG. 11, an area so that each strain detecting resistive element S is hidden by that thin-film resistor 22 formed at the upper layer thereof as viewed from the top of the chip in a planar view. It is not necessary that the area of each strain detecting resistive element S exactly matches the area of the thin-film resistor 22 at the upper layer thereof, and the area of the thin-film resistor 22 may be slightly smaller or larger than the area of the strain detecting resistive element S.

Figure 12:
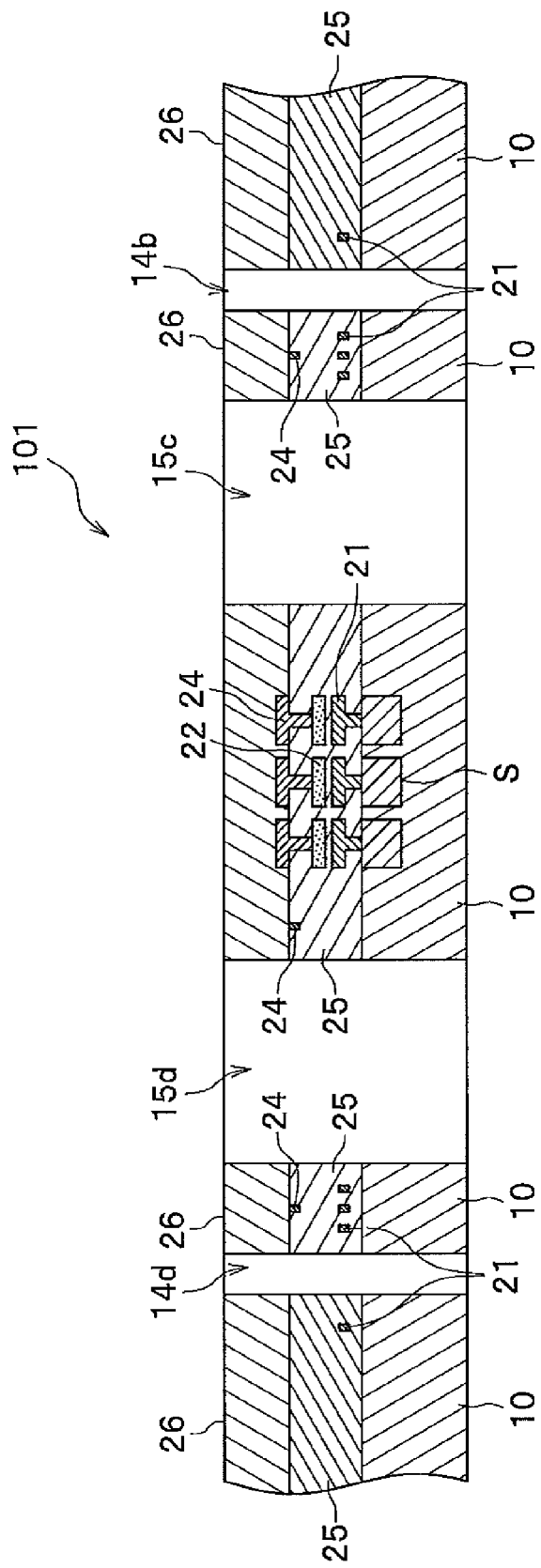
FIG. 12 is a schematic diagram showing a cross section of the force sensor chip according to the second embodiment, and is a cross-sectional view along a line A-A in FIG. 2.

As shown in FIG. 12, the thin-film resistor 22 is formed at the upper layer in the vicinity of the strain detecting resistive element S with the resistive-element wiring 21 and the interlayer insulation film 25 intervening therebetween.

As shown in FIG. 12, the thin-film-resistor wirings 24 are formed at the upper layers of respective thin-film resistors 22. As shown in FIG. 11, the thin-film resistor 22 has one end connected to the high-potential electrode 23a through the thin-film-resistor wiring 24 and has another end connected to the low-potential electrode 23b through such a wiring 24. Also, the passivation film 26 is formed at the upper layer of the thin-film resistor 22 with the thin-film-resistor wirings 24 and the interlayer insulation film 25 intervening therebetween.

Because the force sensor chip 101 has the thin-film resistor 22 formed at the upper layer of the strain detecting resistive element S so as to have the same area as that of the strain detecting resistive element S and has the same number of thin-film resistors 22 as that of the strain detecting resistive elements S, the resistive heat by the thin-film resistor 22 can be efficiently transferred to only the strain detecting resistive element S. Accordingly, a voltage applied to the thin-film resistor 22 can be reduced, and an effect of the resistive heat to the base member 10 can be reduced as much as possible.

Next, with reference to FIGS. 13 and 14, a detailed explanation will be given of a force sensor chip 102 according to a third embodiment. Like the force sensor chips 100 and 101, the force sensor chip 102 according to the third embodiment has a stacked layer structure of the base member 10, the strain detecting resistive elements S, the resistive-element wirings 21, the thin-film resistors 22, the thin-film-resistor wirings 24, the interlayer insulation film 25, and the passivation film 26, although it is not illustrated in the figures. Accordingly, the same structural element as those of the force sensor chips 100 and 101 will be denoted by the same reference numeral, and the duplicated explanation thereof will be omitted. Also, the force sensor chip 102 has the same circuit diagrams (see FIGS. 7A and 7B) representing electrical connections as those of the force sensor chips 100 and 101.

However, the force sensor chip 102 has differences in the shape of a through-hole in the base member 10, the wiring layout in the interior of the chip, and the number of temperature-compensation resistive elements 28 from the force sensor chips 100 and 101. That is, as shown in FIG. 13, the force sensor chip 102 has four first through-holes 16 formed in the base member 10 as substantially straight slits, respectively, and a non-deformable region (a free end) is formed at the exterior of the right first through-hole 16 and at the center of such an exterior in a planar view of FIG. 13. A monitoring resistive element 28a is arranged at this non-deformable region.

Figure 13:
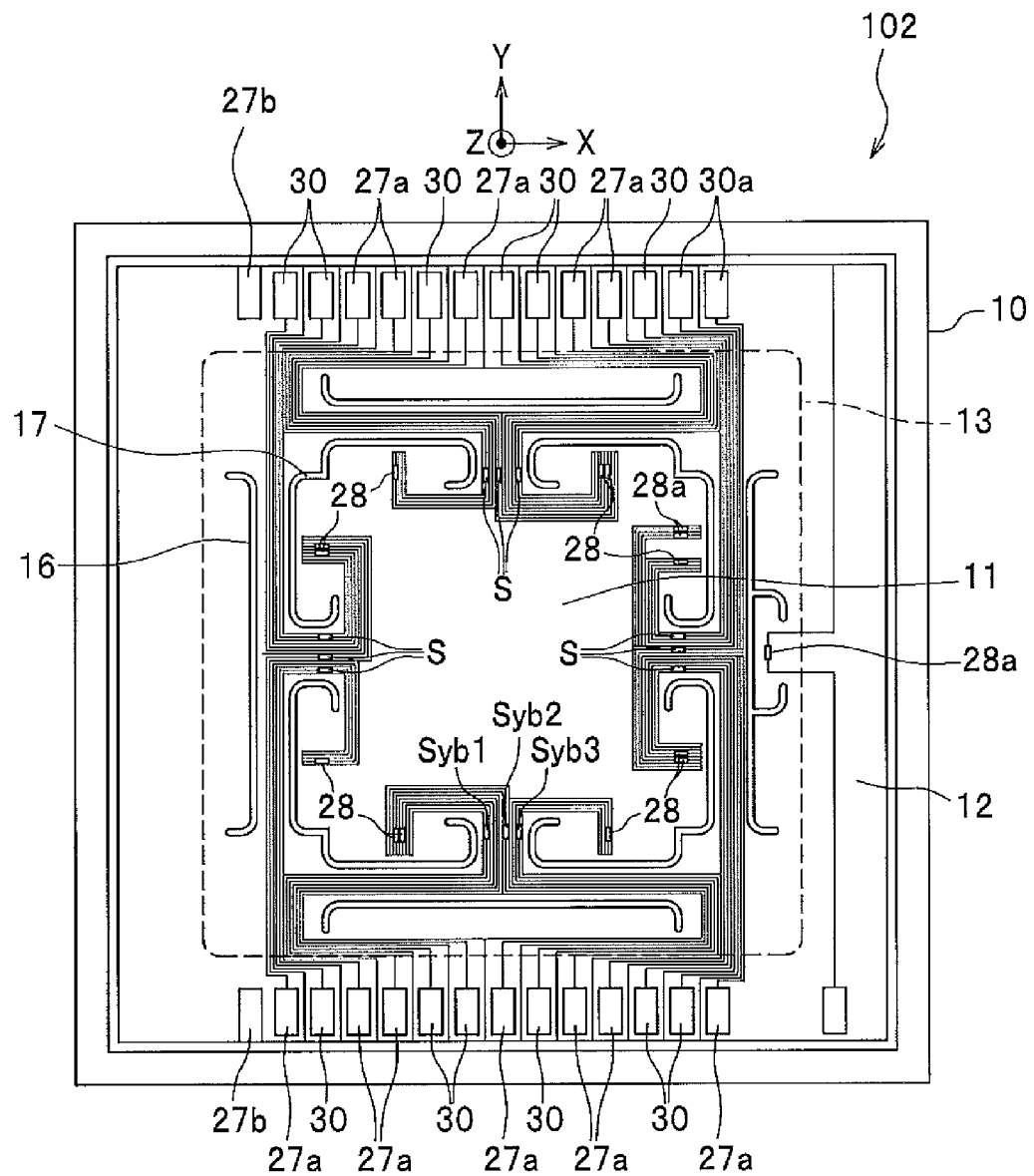
FIG. 13 is a schematic diagram showing a strain detecting resistive element of the force sensor chip according to the third embodiment and a wiring condition of such resistive element.

Also, as shown in FIG. 13, the force sensor chip 102 has four second through-holes 17 formed in the base member 10 as unciform slits, respectively, and non-deformable regions are formed inwardly of each second through-hole 17. Temperature-compensation resistive elements 28 and the monitoring resistive elements 28a are formed at respective non-deformable regions.

According to the force sensor chip 102, as shown in FIG. 13, plural (in the third embodiment, three) strain detecting resistive elements S are formed at each deformation producing portion of the base member 10, i.e., the deformation producing portion that is a connection part between the action portion 11 and the connecting portion 13. Twelve temperature-compensation resistive elements 28 are arranged in the vicinity of strain detecting resistive elements S so as to match the number thereof. Also, the thin-film resistors 22 (not illustrated) are formed at the upper layer of respective strain detecting resistive elements S like the force sensor chips 100 and 101. The thin-film resistor 22 can be formed to have an area covering the plural strain detecting resistive elements S like the force sensor chip 100 or to the same area as that of each strain detecting resistive element S like the force sensor chip 101, and the same number of thin-film resistors 22 can be formed as that of the strain detecting resistive elements S.

The monitoring resistive elements 28a are each for obtaining a chip temperature (also a temperature of a sensor assembly after the sensor is fabricated). The monitoring resistive element 28a comprises a piezo resistive element, and detects a change in an environmental temperature as a change in the resistance value. The monitoring resistive element 28a comprises the element having the same characteristic as that of the strain detecting resistive element S. As shown in FIG. 13, the monitoring resistive elements 28a are formed on the base member 10 or the non-deformable region of the action portion 11. Also, the monitoring resistive elements 28a may be formed on both support portion 12 and non-deformable region of the action portion 11.

As explained above, the temperature-compensation resistive element 28 is formed on the base member 10 for each strain detecting resistive element S, and configures a bridge circuit together with the strain detecting resistive element S, but the monitoring resistive element 28a is provided chip by chip. Other resistive elements configuring the bridge circuit together with the monitoring resistive element 28a are formed on an analog substrate (not illustrated) outside the chip.

As shown in FIG. 13, the monitoring resistive elements 28a are arranged at respective non-deformable regions which are not affected by a strain originating from an application of an external force F. That is, each of the monitoring resistive element 28a is arranged at the region inwardly of the second through-hole 17 and outwardly of the right first through-hole 16 which is the non-deformable region in the vicinity of the corresponding temperature-compensation resistive element 28. By arranging the monitoring resistive element 28a at a location which is not affected by an external force, the force sensor chip 102 can obtain the chip temperature thereof.

Figure 14A:
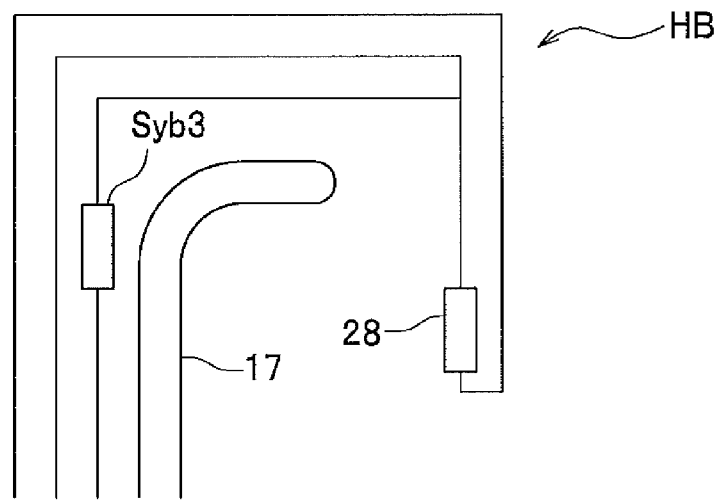
FIG. 14A is a schematic diagram showing a specific example of a strain detecting resistive element of the force sensor chip according to the third embodiment and that of a wiring condition, and is a diagram showing a half-bridge circuit.

When the force sensor chip 102 is configured by a half-bridge circuit HB, a wiring condition shown in FIG. 14A more specifically is employed. FIG. 14A shows an example in which the strain detecting resistive element Syb3 shown in FIG. 13 and the temperature-compensation resistive element 28 in the vicinity thereof configure a half-bridge circuit HB. Moreover, the wiring condition shown in FIG. 14A represents a specific element layout and a wiring condition thereof in the electrical connection shown in FIG. 7A.

In the half-bridge circuit HB, as shown in FIG. 14A, respective one ends (upper side of FIG. 14A) of the strain detecting resistive element Syb3 and the temperature-compensation resistive element 28 are connected together, and the connection therebetween is connected to the ground potential GND (not illustrated). Also, another end (lower side of FIG. 14A) of the strain detecting resistive element Syb3 is connected to the signal electrode 27a (not illustrated), and another end (lower side of FIG. 14A) of the temperature-compensation resistive element 28 is connected to the temperature-compensation electrode 30 (not illustrated).

In the half-bridge circuit HB, the strain detecting resistive element S is provided on the connecting portion 13, and the temperature-compensation resistive element 28 is provided on the support portion 12 or on the above-explained non-deformable region.

Figure 14B:
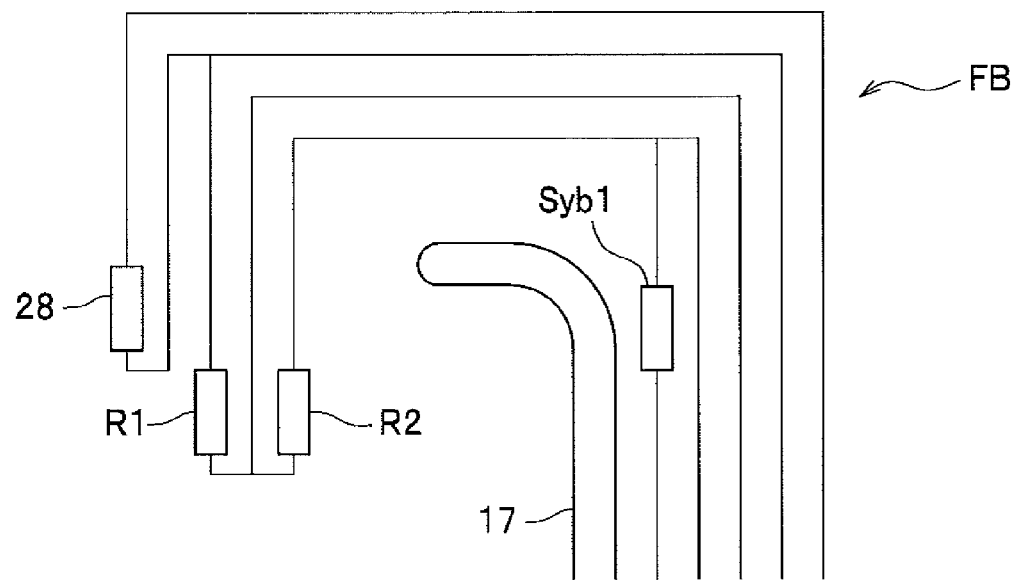
FIG. 14B is a schematic diagram showing a specific example of a strain detecting resistive element of the force sensor chip according to the third embodiment and that of a wiring condition, and is a diagram showing a full-bridge circuit.

When the force sensor chip 102 is configured by a full-bridge circuit FB, a wiring condition shown in FIG. 14B more specifically is employed. FIG. 14B shows an example in which the strain detecting resistive element Syb1 in FIG. 13 and the temperature-compensation resistive element 28 in the vicinity thereof configure a full-bridge circuit FB. The wiring condition shown in FIG. 14B represents a specific element layout and a wiring condition thereof in the electrical connection shown in FIG. 7B.

In the full-bridge circuit FB, as shown in FIG. 14B, one end (upper side of FIG. 14B) of the strain detecting resistive element Syb1 is connected to one end (upper side of FIG. 14B) of an external resistor R2 together, and the connection therebetween is connected to the signal electrode 27a (not illustrated). Also, another end (lower side of FIG. 14B) of the temperature-compensation resistive element 28 and one end (upper side of FIG. 14B) of an external resistor R1 are connected together, and the connection therebetween is connected to the temperature-compensation electrode 30 (not illustrated).

Respective another ends (lower side of FIG. 14B) of the external resistor R1 and the external resistor R2 are connected together, and the connection therebetween is connected to a power-source voltage (not illustrated). Another end (upper side of FIG. 14B) of the strain detecting resistive element Syb1 and one end (upper side of FIG. 14B) of the temperature-compensation resistive element 28 are connected together (which is not illustrated), and are connected to the ground potential GND (not illustrated).

In the case of full-bridge circuit FB, the strain detecting restive element S is provided on the connecting portion 13, and the temperature-compensation resistive element 28 and other resistive elements (the external resistors R1 and R2) forming the bridge are formed on the support portion 12 or the above-explained non-deformable region.

As explained above, the force sensor chip 102 ensures the non-deformable region on the base member 10 by devising respective shapes of the first through-hole and second through-hole, and the temperature-compensation resistive element 28 and the monitor resistive element 28a are arranged on the non-deformable region. Accordingly, because the force sensor chip 102 can perform temperature compensation for each strain detecting resistive element S, an effect of an environmental temperature is appropriately eliminated from the sensor output value, so that an external force can be detected more precisely.

Figure 15A:
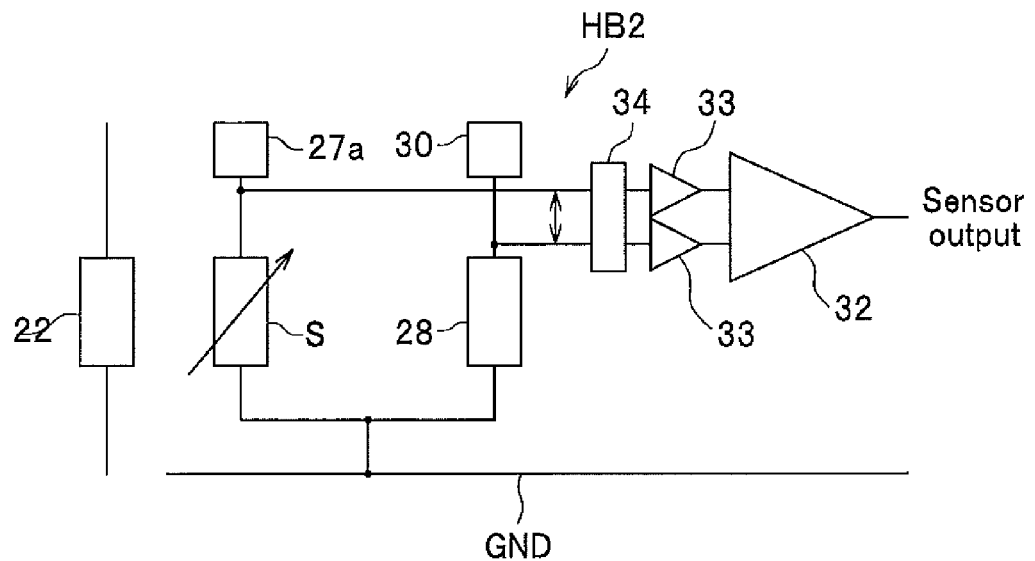
FIG. 15A is a circuit diagram of an electrical connection when an LPF and an AD converter are built in the chip of a force sensor according to first, second, third embodiments and a modified example, and is a diagram showing a half-bridge circuit added with a buffer amplifier.
Figure 15B:
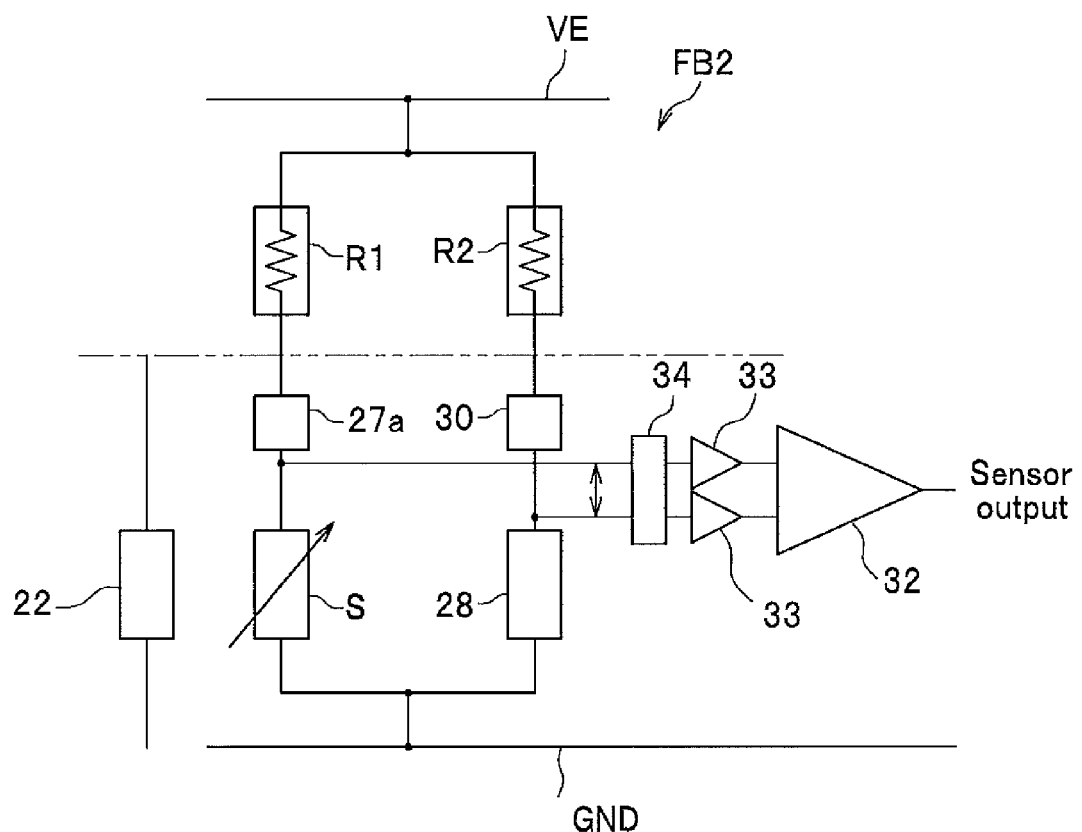
FIG. 15B is a circuit diagram of an electrical connection when an LPF and an AD converter are built in the chip of a force sensor according to first, second, third embodiments and a modified example, and is a diagram showing a full-bridge circuit added with a buffer amplifier.

Next, with reference to FIGS. 15A and 15B, a modified example of the above-explained force sensor chips 100, 101, and 102 will be explained. A half-bridge circuit HB2 shown in FIG. 15A and a full-bridge circuit FB2 shown in FIG. 15B are the half-bridge circuit HB and the full-bridge circuit FB (see FIGS. 7A and 7B), respectively, of the above-explained force sensor chips 100, 101, an 102, added with buffer amplifiers 33. Hence, the same structural element as that of the half-bridge circuit HB and the full-bridge circuit FB will be denoted by the same reference numeral, and the duplicated explanation thereof will be omitted.

The buffer amplifiers 33 convert the high impedance of a strain detection signal into a low impedance, thereby suppressing the effect of noises. As shown in FIGS. 15A and 15B, the buffer amplifiers 33 are connected between the strain detecting resistive element S/the temperature-compensation resistive element 28 and the AD converter 32. As shown in FIGS. 15A and 15B, the buffer amplifiers 33 are built in the sensor like the AD converter 32 shown in FIGS. 7A and 7B. By having such buffer amplifiers 33, the force sensor chips 100 and 101 can suppress the effect of noises, thereby detecting an external force applied to the action portion 11 more precisely.

Figure 16A:
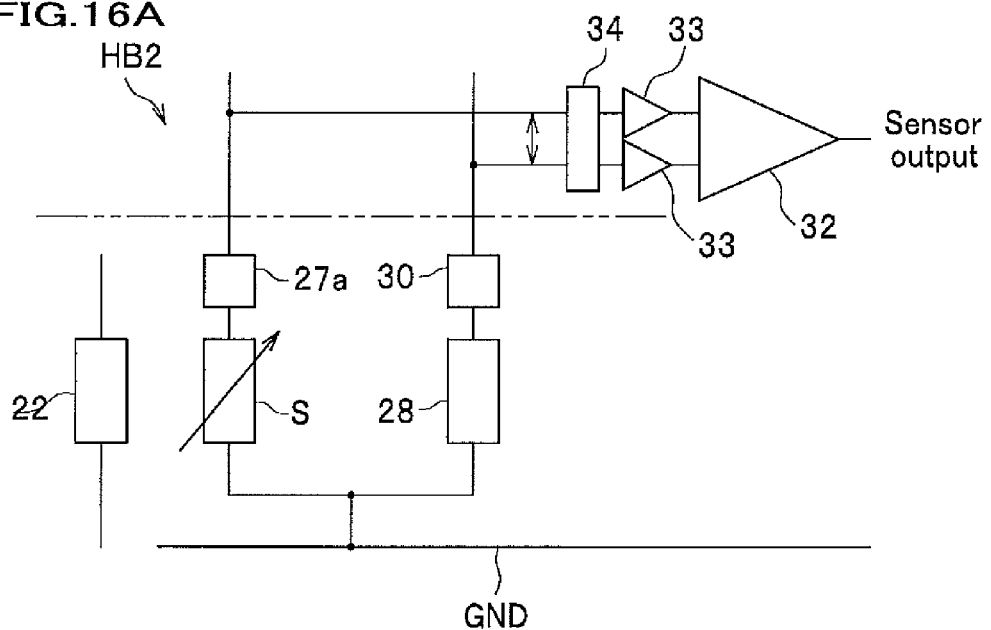
FIG. 16A is a circuit diagram of an electrical connection when an LPF and an AD converter are built at the exterior of the chip of a force sensor according to the first, second, third embodiments and a modified example, and is a diagram showing a half-bridge circuit added with a buffer amplifier.
Figure 16B:
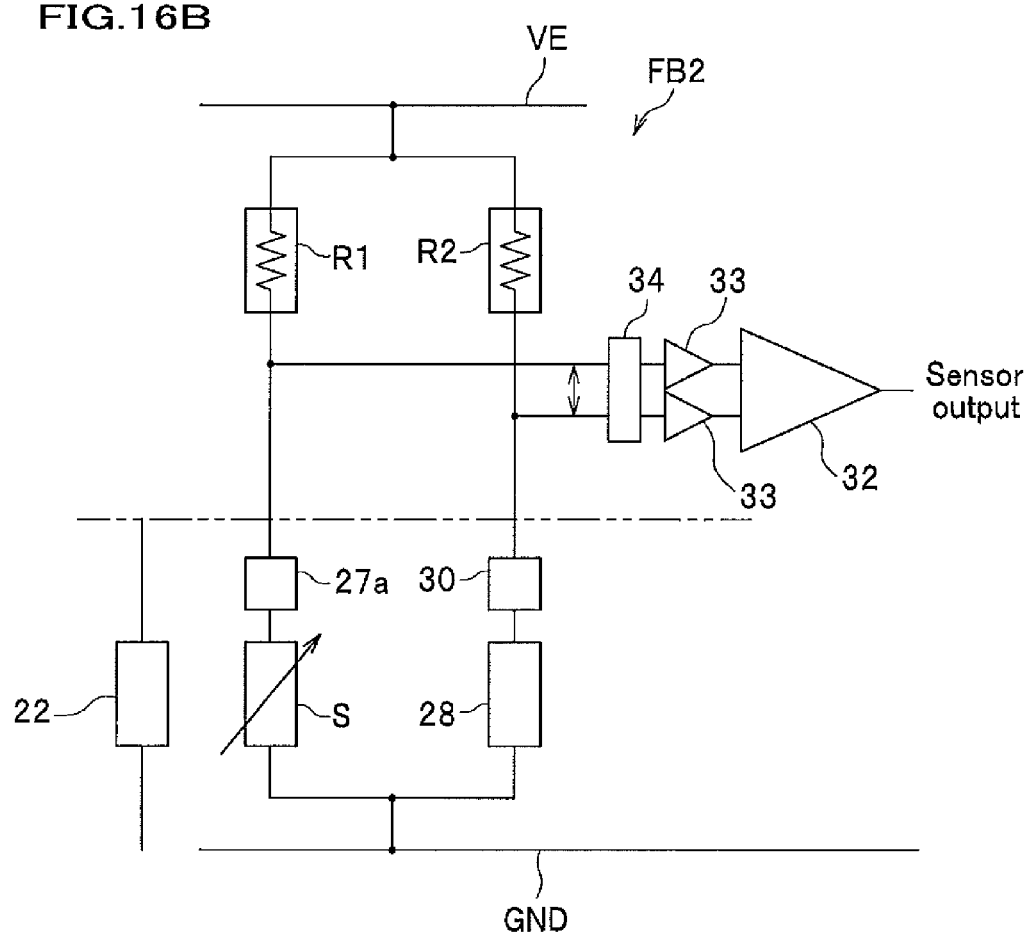
FIG. 16B is a circuit diagram of an electrical connection when an LPF and an AD converter are built at the exterior of the chip of a force sensor according to the first, second, third embodiments and a modified example, and is a diagram showing a full-bridge circuit added with a buffer amplifier.

Also, as shown in FIGS. 16A and 16B, the buffer amplifiers 33 may be provided on an analog substrate (not illustrated) outside the sensor like the AD converter 32 shown in FIGS. 8A and 8B.

The above-explained force sensor chips 100, 101 and 102 have the strain detecting resistive elements S, the thin-film resistors 22, and the like stacked on the front surface of the sensor, but those may be stacked on the rear surface thereof, and a configuration of detecting an external force and a moment through strain detecting resistive elements S formed on both surfaces may be employed. In this case, the configuration of the strain detecting resistive element S and that of the thin-film resistor 22 formed on the rear surface of the sensor are same as those shown in the above-explained FIGS. 1, 2, 4, 5, 11, and 13. In this fashion, by providing the strain detecting resistive element S, the thin-film resistor 22, and the like on both surfaces of the of force sensor chips 100, 101, and 102, when, for example, a force of a single force component is input, such an external force can be detected more precisely. Accordingly, interference in another axial direction can be suppressed more efficiently in comparison with a one-surface configuration.

Next, with reference to FIGS. 17 to 19, a brief explanation will be given of an acceleration sensor chip 200 having the thin-film resistors 22. The acceleration sensor is for measuring an acceleration in each of three axes (X axis, Y axis and Z axis) orthogonal to each other using resistive elements, and the acceleration sensor chip 200 serves such a sensor function.

Figure 17:
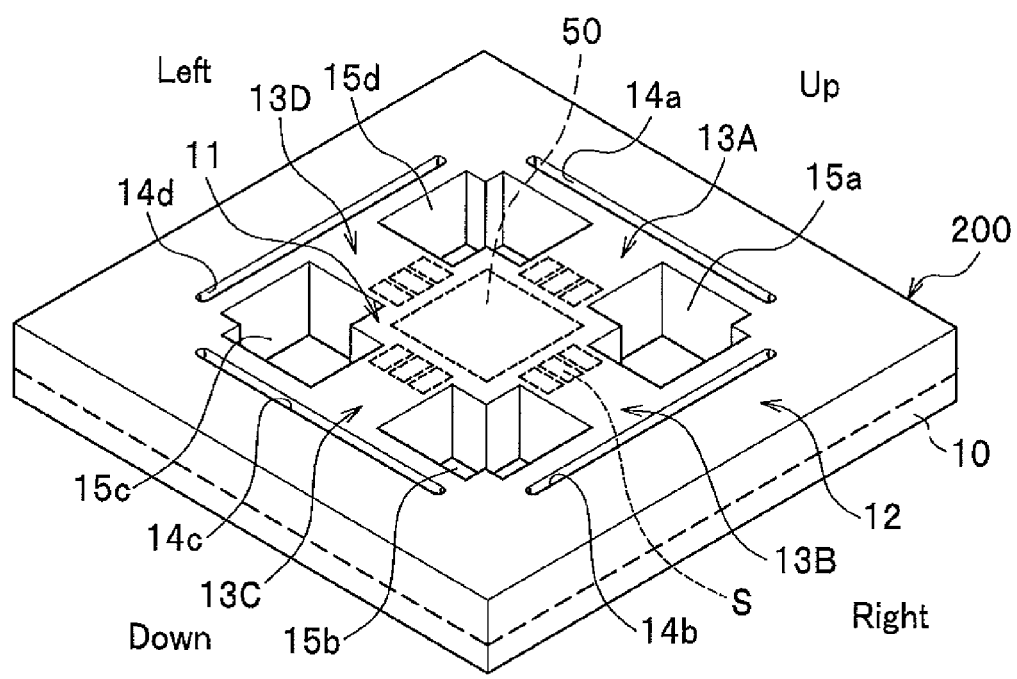
FIG. 17 is a perspective view showing a whole configuration of an acceleration sensor chip according to the first and second embodiments.
Figure 18:
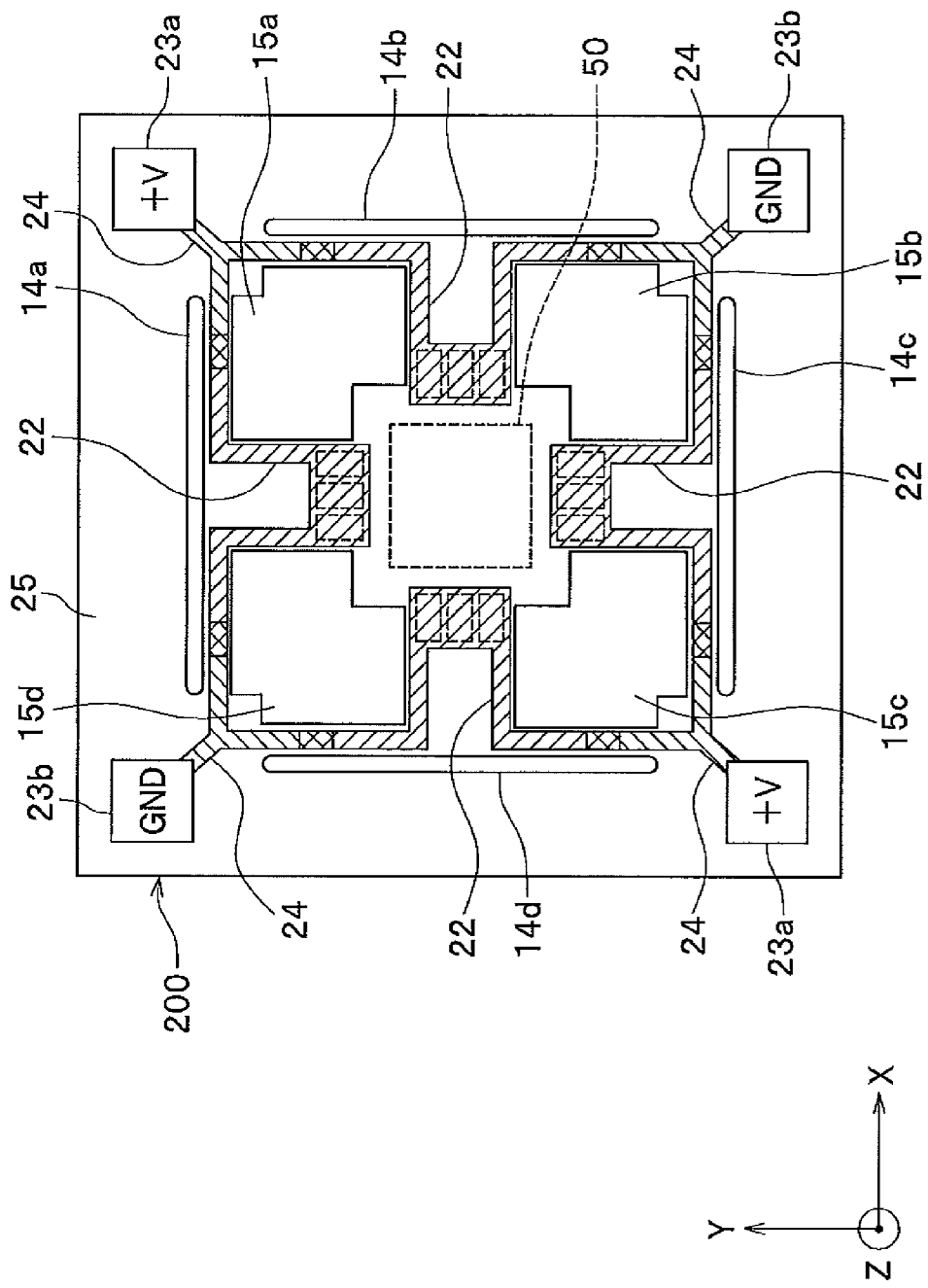
FIG. 18 is a schematic diagram showing a thin-film resistor of the acceleration sensor chip according to the first embodiment and a wiring condition of such resistor, and is a plan view of the acceleration sensor chip shown in FIG. 17 without a passivation film and an interlayer insulation film on the thin-film resistor.

As shown in FIG. 17, the acceleration sensor chip 200 employs the same configuration as those of the force sensor chips 100 and 101 except that the action portion 11 is provided with a weight 50. Hence, the same structural element as those of the force sensor chips 100 and 101 will be denoted by the same reference numeral, and the duplicated explanation thereof will be omitted. Also, the acceleration sensor chip 200 has the same strain detecting resistive elements S, wiring conditions (see FIG. 5), and circuit diagram representing the electrical connection (see FIG. 7) as those of the force sensor chips 100 and 101, so that duplicated explanation thereof will be also omitted.

The acceleration sensor chip 200 is for detecting a strain of the strain detecting resistive elements S due to an inertial force acting on the action portion 11, so that the external-force transferring member (not illustrated) that directly applies an external force to the action portion 11 is unnecessary. Also, the acceleration sensor chip 200 improves the sensitivity to an acceleration if the connecting portions 13 can bend. Accordingly, it is preferable to form the connecting portions 13 thinner than the action portion 11 having the weight 50 and the support portion 12.

The weight 50 produces a displacement upon receiving an inertial force when an acceleration acts on the sensor casing (not illustrated). As shown in FIG. 17, the weight 50 is arranged at the center of the support portion 12, and is formed in, for example, a square shape. The specific arrangement position of the weight 50 is not limited to any particular one as long as it can produce a displacement relative to the support portion 12 when the sensor casing receives an acceleration, and for example, the weight 50 can be arranged at the bottom of the base member 10 (see FIG. 3). The weight 50 can be formed of a plate like glass.

According to the acceleration sensor chip 200 having such a configuration, when an external force together with an acceleration is applied to the sensor casing and thus the support portion 12, the weight 50 makes a displacement relative to the support portion 12, the strain detecting resistive element S provided at the deformation producing portion strains, and the resistance value thereof changes. A change in the output voltage of each strain detecting resistive element S is detected based on the change in the resistance value, thereby measuring the magnitude of the acceleration.

Like the force sensor chips 100 and 101, the acceleration sensor chip 200 has the thin-film resistors 22 arranged in the vicinity of (at the upper layers of) respective strain detecting resistive elements S so as to face respective strain detecting resistive elements S. More specifically, as shown in FIG. 18, each thin-film resistors 22 is formed to have an area covering the plural strain detecting resistive elements S in a planar view.

The acceleration sensor chip 200 having such a configuration has the thin-film resistors 22 at the upper layer of the strain detecting resistive elements S with an area covering the plural strain detecting resistive elements S. Accordingly, when a voltage is applied to the thin-film resistors 22 across the high-potential electrode 23a and the low-potential electrode 23b, the plural strain detecting resistive elements S are heated by resistive heat of the thin-film resistor 22 without a time lag and a temperature varying. Therefore, it is possible to promote the self-heat-generation of the strain detecting resistive element S at a low cost, the time of the transient condition can be shortened, and a deformation of the base member 10 originating from an excessive heat can be suppressed.

Figure 19:
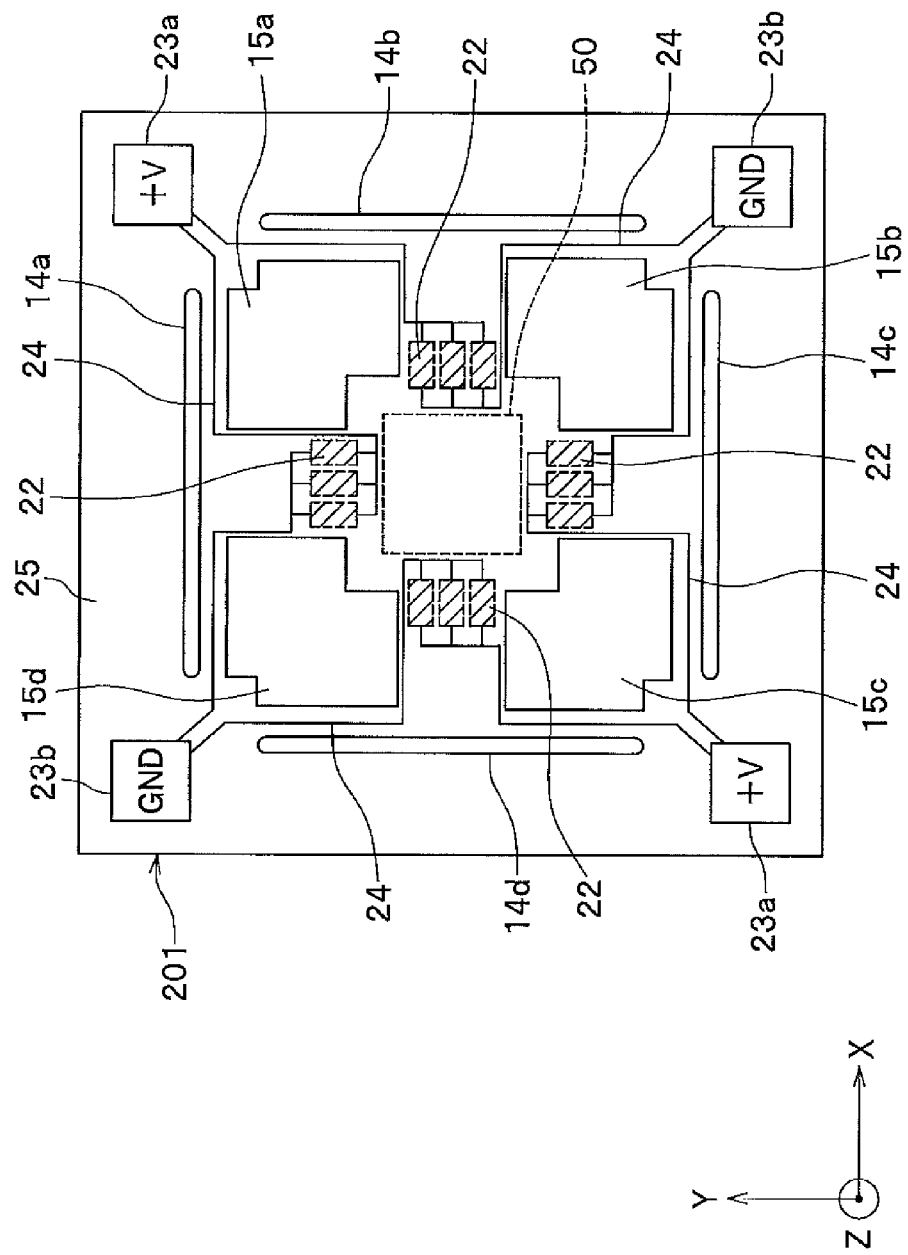
FIG. 19 is a schematic diagram showing a thin-film resistor of the acceleration sensor chip according to the second embodiment and a wiring condition of such resistor, and is a plan view of the acceleration sensor chip shown in FIG. 17 without a passivation film, an interlayer insulation film on the thin-film resistor, and a thin-film-resistor wiring.

As shown in FIG. 19, the thin-film resistor 22 can be formed to have an area equal to the area of each strain detecting resistive element S in a planar view and the same number of thin-film resistors 22 can be formed as that of the strain detecting resistive elements S.

An acceleration sensor chip 201 having such a configuration has the thin-film resistor 22 at the upper layer of the strain detecting resistive element S with the same area as that of each strain detecting resistive element S and the same number of thin-film resistors 22 are formed as that of the strain detecting resistive elements S, so that the resistive heat by the thin-film resistor 22 can be efficiently transferred to the strain detecting resistive element S. Therefore, a voltage applied to the thin-film resistor 22 can be reduced, and the effect of the resistive heat to the base member 10 can be suppressed as much as possible.

What is claimed is:

1. A chip for a force sensor that detects an external force, comprising:
a base member including:
an action portion where the external force is applied;
a support portion that supports the action portion therearound; and
a connecting portion that connects the action portion and the support portion together;
a plurality of strain detecting resistive elements that are formed at respective deformation producing portions of the base member which deform when the external force is applied;
a thin-film resistor that is formed at upper layers of the strain detecting resistive elements with a resistive-element wiring and an interlayer insulation film intervening between the thin-film resistor and the strain detecting resistive elements; a high-potential electrode and a low-potential electrode that are formed on the support portion; and a thin-film-resistor wiring that connects the thin-film resistor to the high-potential electrode and to the low-potential electrode,
wherein the thin-film resistor is formed to have an area covering the plurality of strain detecting resistive elements in a planar view has one end connected to the high-potential electrode through the thin-film-resistor wiring, and has another end connected to the low-potential electrode through the thin-film-resistor wiring.

2. The force sensor chip according to claim 1, further comprising:
a passivation film formed at an upper layer of the thin-film resistor with the interlayer insulation film intervening therbetween.

3. The force sensor chip according to claim 2, wherein
the connecting portions are formed around a center of the action portion so as to be symmetrical at four positions to the center of the action portion, and
the high-potential electrode and the low-potential electrode are formed at diagonal positions on the support portion.

4. The force sensor chip according to claim 3, wherein the action portion, the support portion and the connecting portion are functionally separated from one another by a first through-hole.

5. The force sensor chip according to claim 4, wherein each of the connecting portions includes a region with a high rigidity and a region with a low rigidity.

6. The force sensor chip according to claim 5, wherein the region with a high rigidity and the region with a low rigidity are functionally separated from each other by a second through-hole.

7. A chip for an acceleration sensor that detects an acceleration, comprising:
a base member including:
an action portion with a weight that makes a displacement when an acceleration acts thereon;
a support portion that supports the action portion therearound; and
a connecting portion that connects the action portion and the support portion together;
a plurality of strain detecting resistive elements formed at respective deformation generating portions of the base member that deform when the acceleration is applied;
a thin-film resistor that is formed at upper layers of the strain detecting resistive elements with a resistive-element wiring and an interlayer insulation film intervening between the thin-film resistor and the strain detecting resistive elements; a high-potential electrode and a low-potential electrode that are formed on the support portion; and a thin-film-resistor wiring that connects the thin-film resistor to the high-potential electrode and to the low-potential electrode,
wherein the thin-film resistor is formed to have an area covering the plurality of strain detecting resistive elements in a planar view has one end connected to the high-potential electrode through the thin-film-resistor wiring, and has another end connected to the low-potential electrode through the thin-film-resistor wiring.

8. The acceleration sensor chip according to claim 7, further comprising:
a passivation film formed at an upper layer of the thin-film resistor with the interlayer insulation film intervening therbetween.

9. The acceleration sensor chip according to claim 8, wherein
the connecting portions are formed around a center of the action portion so as to be symmetrical at four positions to the center of the action portion, and
the high-potential electrode and the low-potential electrode are formed at diagonal positions on the support portion.

10. The acceleration sensor chip according to claim 9, wherein the action portion, the support portion and the connecting portion are functionally separated from one another by a first through-hole.

11. The acceleration sensor chip according to claim 10, wherein each of the connecting portions includes a region with a high rigidity and a region with a low rigidity.

12. The acceleration sensor chip according to claim 11, wherein the region with a high rigidity and the region with a low rigidity are functionally separated from each other by a second through-hole.

13. A chip for a force sensor that detects an external force, comprising:
a base member including:
an action portion where the external force is applied;
a support portion that supports the action portion therearound; and
a connecting portion that connects the action portion and the support portion together;
a plurality of strain detecting resistive elements that are formed at respective deformation producing portions of the base member which deform when the external force is applied;
a thin-film resistor that is formed at upper layers of the strain detecting resistive elements with a resistive-element wiring and an interlayer insulation film intervening between the thin-film resistor and the strain detecting resistive elements; a high-potential electrode and a low-potential electrode that are formed on the support portion; and a thin-film-resistor wiring which is formed at an upper layer of the thin-film resistor and which is connects the thin film resistor to the high-potential electrode and to the low-potential electrode,
wherein the thin-film resistor is formed to have a same area as the area of each strain detecting resistive element, and a same number of thin-film resistors are formed as a number of the strain detecting resistive elements the thin film resistor having one end connected to the high-potential electrode through the thin-film-resistor wiring, and having another end connected to the low-potential electrode through the thin-film-resistor wiring.

14. The force sensor chip according to claim 13, further comprising:
a passivation film formed at an upper layer of the thin-film resistor with the thin-film-resistor wiring and the interlayer insulation film intervening between the passivation film and the thin-film resistor.

15. A chip for an acceleration sensor that detects an acceleration, comprising:
a base member including:
an action portion with a weight that makes a displacement when an acceleration acts thereon;
a support portion that supports the action portion therearound; and
a connecting portion that connects the action portion and the support portion together;
a plurality of strain detecting resistive elements formed at respective deformation generating portions of the base member that deform when the acceleration is applied;
a thin-film resistor that is formed at upper layers of the strain detecting resistive elements with a resistive-element wiring and an interlayer insulation film intervening between the thin-film resistor and the strain detecting resistive elements; a high-potential electrode and a low-potential electrode that are formed on the support portion; and a thin-film-resistor wiring which is formed at an upper layer of the thin-film resistor and which connects the thin film resistor to the high-potential electrode and to the low-potential electrode,
wherein the thin-film resistor is formed to have a same area as the area of each strain detecting resistive element, and a same number of thin-film resistors are formed as a number of the strain detecting resistive elements the thin film resistor having one end connected to the high-potential electrode through the thin-film-resistor wiring, and having another end connected to the low-potential electrode through the thin-film-resistor wiring.

16. The acceleration sensor chip according to claim 15, further comprising:
a passivation film formed at an upper layer of the thin-film resistor with the thin-film-resistor wiring and the interlayer insulation film intervening between the passivation film and the thin-film resistor.

* * * * *